US012593317B2

(12) United States Patent
Sridharan et al.

(10) Patent No.: US 12,593,317 B2
(45) Date of Patent: Mar. 31, 2026

(54) BIT SELECTION FOR MULTI-SLOT UPLINK SHARED CHANNEL TRANSMISSION

(71) Applicant: QUALCOMM Incorporated, San Diego, CA (US)

(72) Inventors: Gokul Sridharan, Sunnyvale, CA (US); Peter Gaal, San Diego, CA (US); Sanghoon Kim, San Jose, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 622 days.

(21) Appl. No.: 17/934,077

(22) Filed: Sep. 21, 2022

(65) Prior Publication Data

US 2023/0109618 A1 Apr. 6, 2023

Related U.S. Application Data

(60) Provisional application No. 63/261,998, filed on Oct. 1, 2021.

(51) Int. Cl.
*H04W 72/0446* (2023.01)
*H04L 1/00* (2006.01)

(52) U.S. Cl.
CPC ....... *H04W 72/0446* (2013.01); *H04L 1/0071* (2013.01)

(58) Field of Classification Search
CPC ............. H04W 72/0446; H04L 1/0071; H04L 1/0041; H04L 5/0044; H04L 1/0067
See application file for complete search history.

(56) References Cited

U.S. PATENT DOCUMENTS

| | | | | |
|---|---|---|---|---|
| 10,819,470 B2 * | 10/2020 | Chatterjee | ......... | H04W 74/0858 |
| 2024/0179700 A1 * | 5/2024 | Su | ......... | H04L 1/1864 |
| 2024/0224268 A1 * | 7/2024 | Ermolaev | ......... | H04W 72/1268 |

FOREIGN PATENT DOCUMENTS

WO WO-2022217277 10/2022

OTHER PUBLICATIONS

Ericsson: "TB Processing over Multi-Slot PUSCH", R1-2107560, 3GPP TSG-RAN WG1 Meeting #106-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, XP052038469, 19 Pages, Sections 2, 2.1-2.5.

(Continued)

*Primary Examiner* — Chandrahas B Patel
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of one or more sets of time domain resources for a multi-slot transmission occasion that spans multiple slots. The UE may select, for one or more codeblocks of a communication on the multi-slot transmission occasion, non-contiguous coded bits of a plurality of coded bits on a per slot basis for each of the multiple slots. The UE may interleave, for each of the multiple slots, the non-contiguous coded bits to form one or more interleaved encoded bit sequences of the one or more codeblocks. The UE may transmit the communication including the one or more interleaved encoded bit sequences. Numerous other aspects are described.

30 Claims, 18 Drawing Sheets

800 ⟶

Select a subset of bits from circular buffer

} Row-column interleaving

Interleaved bits saved into a new buffer

(56)                           References Cited

OTHER PUBLICATIONS

International Search Report and Written Opinion—PCT/US2022/076843—ISA/EPO—Dec. 19, 2022.
ZTE Corporation: "Discussion on TB Processing Over Multi-Slot PUSCH", R1-2108846, 3GPP TSG RAN WG1 #106-e, Mobile Competence Centre, 650, Route Des Lucioles, F-06921 Sophia-Antipolis Cedex, France, vol. RAN WG1, No. e-Meeting, 10 Pages, Oct. 11, 2021-Oct. 19, 2021, Sep. 30, 2021, XP052057728, Section 2.

* cited by examiner

400

405

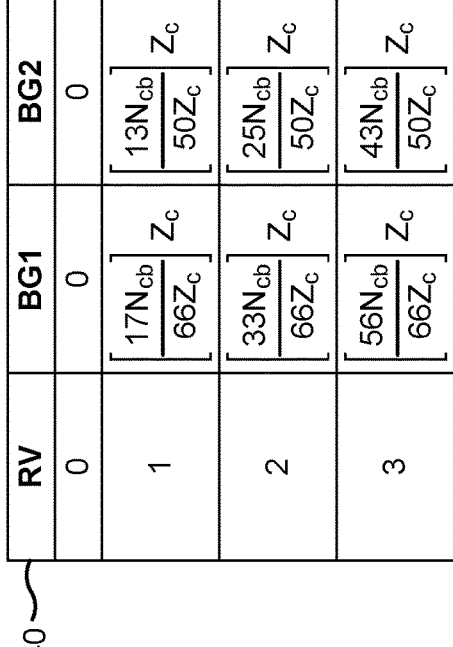

| RV | BG1 | BG2 |
|---|---|---|
| 0 | 0 | 0 |
| 1 | $\left\lfloor \dfrac{17N_{cb}}{66Z_c} \right\rfloor Z_c$ | $\left\lfloor \dfrac{13N_{cb}}{50Z_c} \right\rfloor Z_c$ |
| 2 | $\left\lfloor \dfrac{33N_{cb}}{66Z_c} \right\rfloor Z_c$ | $\left\lfloor \dfrac{25N_{cb}}{50Z_c} \right\rfloor Z_c$ |
| 3 | $\left\lfloor \dfrac{56N_{cb}}{66Z_c} \right\rfloor Z_c$ | $\left\lfloor \dfrac{43N_{cb}}{50Z_c} \right\rfloor Z_c$ |

440

Redundancy version for PUSCH transmission

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | $n \bmod 4 = 0$ | $n \bmod 4 = 1$ | $n \bmod 4 = 2$ | $n \bmod 4 = 3$ |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Select a subset of bits from circular buffer

Row-column interleaving

Interleaved bits saved into a new buffer

Figure 10:
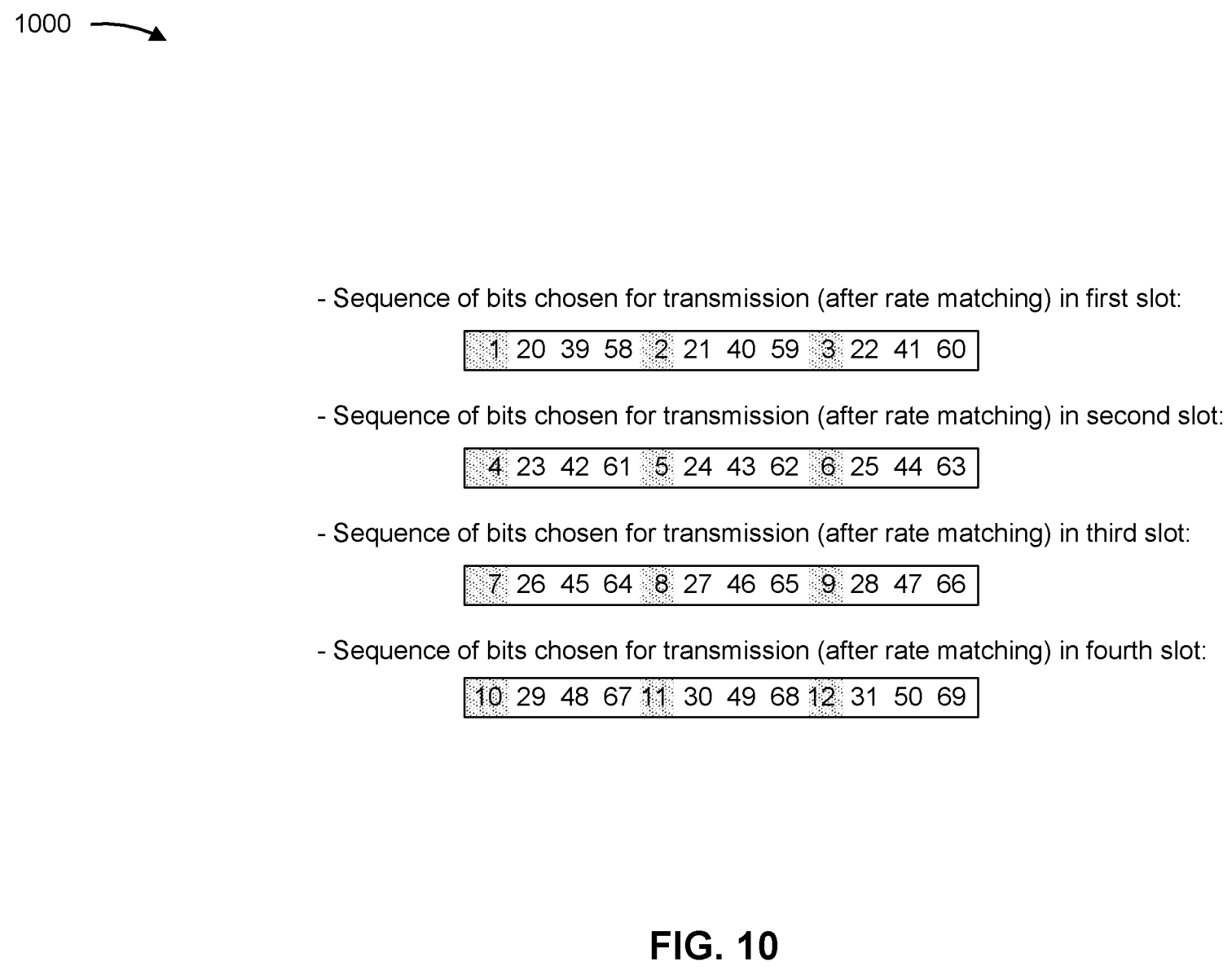

- Sequence of bits chosen for transmission (after rate matching) in first slot:

1 20 39 58 2 21 40 59 3 22 41 60

- Sequence of bits chosen for transmission (after rate matching) in second slot:

4 23 42 61 5 24 43 62 6 25 44 63

- Sequence of bits chosen for transmission (after rate matching) in third slot:

7 26 45 64 8 27 46 65 9 28 47 66

- Sequence of bits chosen for transmission (after rate matching) in fourth slot:

Depth = 4

- Contents of original circular buffer (written in row first order):

| 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|----|----|----|----|----|----|----|----|----|----|
| 20 | 21 | 22 | 23 | 24 | 25 | 26 | 27 | 28 | 29 | 30 | 31 | 32 | 33 | 34 | 35 | 36 | 37 | 38 |
| 39 | 40 | 41 | 42 | 43 | 44 | 45 | 46 | 47 | 48 | 49 | 50 | 51 | 52 | 53 | 54 | 55 | 56 | 57 |
| 58 | 59 | 60 | 61 | 62 | 63 | 64 | 65 | 66 | 67 | 68 | 69 | 70 | 71 | 72 | 73 | 74 | 75 | XX |

- Contents of circular buffer after interleaving (written in row first order):

Bits transmitted in 1st slot

2nd slot     3rd slot     4th slot

- Sequence of bits chosen for transmission (after rate matching) in first slot:

| 1 | 26 | 51 | 2 | 27 | 52 | 3 | 28 | 53 | 4 | 29 | 54 |

- Sequence of bits chosen for transmission (after rate matching) in second slot:

| 5 | 30 | 55 | 6 | 31 | 56 | 7 | 32 | 57 | 8 | 33 | 58 |

- Sequence of bits chosen for transmission (after rate matching) in third slot:

| 9 | 34 | 59 | 10 | 35 | 60 | 11 | 36 | 61 | 12 | 37 | 62 |

- Sequence of bits chosen for transmission (after rate matching) in fourth slot:

| 13 | 38 | 63 | 14 | 39 | 64 | 15 | 40 | 65 | 16 | 41 | 66 |

| Bit seq for 1 → | 1 | 5 | 9 | 13 | 17 | 21 | 25 | 29 | 33 | 37 | 41 | 45 | 49 | 53 | 57 | 61 | 65 | 69 | 73 |
|---|---|---|---|---|---|---|---|---|---|---|---|---|---|---|---|---|---|---|---|
| Bit seq for 2 → | 2 | 6 | 10 | 14 | 18 | 22 | 26 | 30 | 34 | 38 | 42 | 46 | 50 | 54 | 58 | 62 | 66 | 70 | 74 |
| Bit seq for 3 → | 3 | 7 | 11 | 15 | 19 | 23 | 27 | 31 | 35 | 39 | 43 | 47 | 51 | 55 | 59 | 63 | 67 | 71 | 75 |
| Bit seq for 4 → | 4 | 8 | 12 | 16 | 20 | 24 | 28 | 32 | 36 | 40 | 44 | 48 | 52 | 56 | 60 | 64 | 68 | 72 | XX |

← Num. of bits used after rate matching around UCI →

FIG. 13

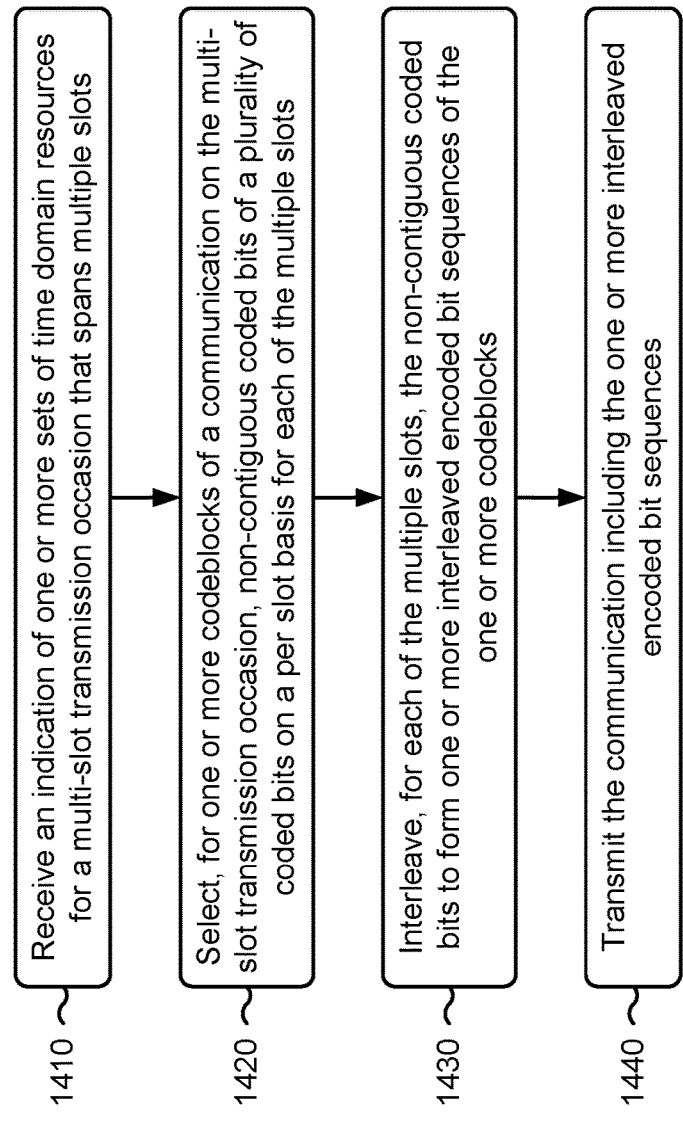

Receive an indication of one or more sets of time domain resources for a multi-slot transmission occasion that spans multiple slots Select, for one or more codeblocks of a communication on the multi-slot transmission occasion, non-contiguous coded bits of a plurality of coded bits on a per slot basis for each of the multiple slots Interleave, for each of the multiple slots, the non-contiguous coded bits to form one or more interleaved encoded bit sequences of the one or more codeblocks Transmit the communication including the one or more interleaved encoded bit sequences

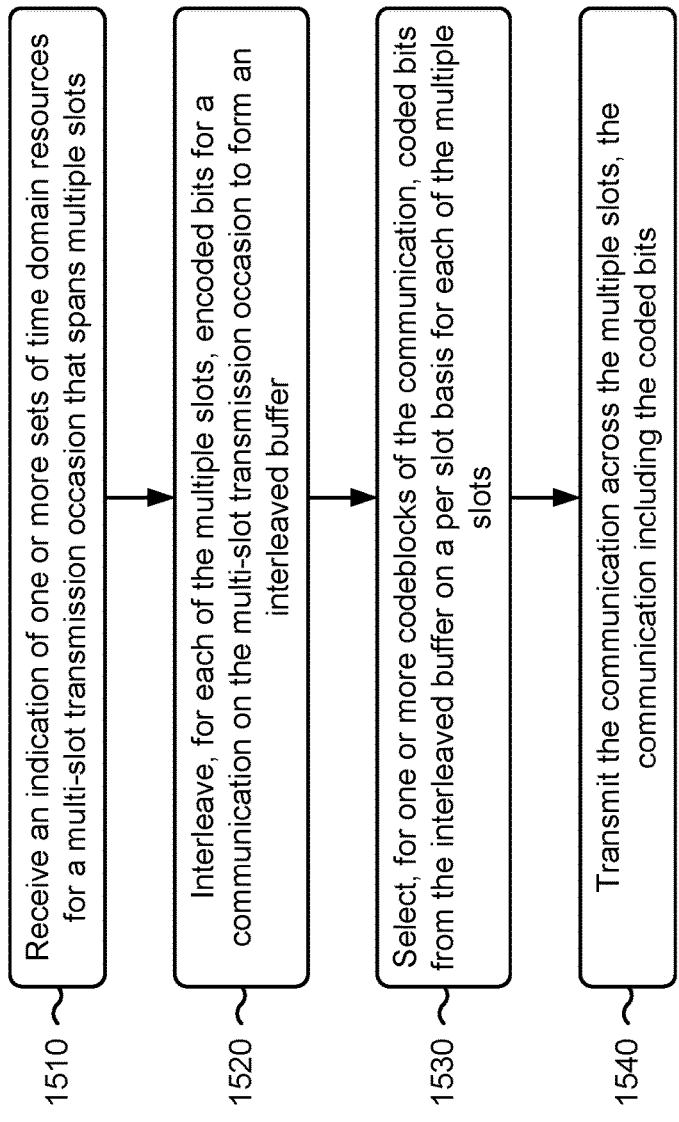

1510 Receive an indication of one or more sets of time domain resources for a multi-slot transmission occasion that spans multiple slots 1520 Interleave, for each of the multiple slots, encoded bits for a communication on the multi-slot transmission occasion to form an interleaved buffer 1530 Select, for one or more codeblocks of the communication, coded bits from the interleaved buffer on a per slot basis for each of the multiple slots 1540 Transmit the communication across the multiple slots, the communication including the coded bits

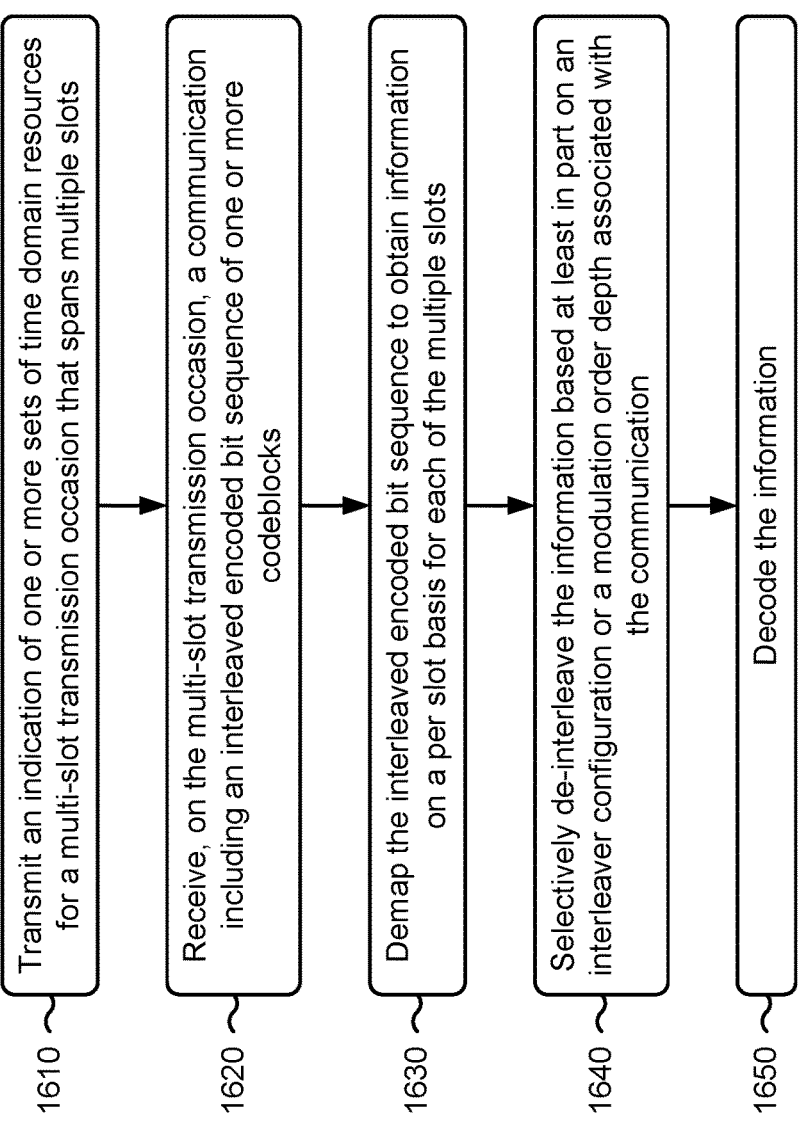

1610 Transmit an indication of one or more sets of time domain resources for a multi-slot transmission occasion that spans multiple slots 1620 Receive, on the multi-slot transmission occasion, a communication including an interleaved encoded bit sequence of one or more codeblocks 1630 Demap the interleaved encoded bit sequence to obtain information on a per slot basis for each of the multiple slots 1640 Selectively de-interleave the information based at least in part on an interleaver configuration or a modulation order depth associated with the communication 1650 Decode the information

BIT SELECTION FOR MULTI-SLOT UPLINK SHARED CHANNEL TRANSMISSION

CROSS-REFERENCE TO RELATED APPLICATION

This patent application claims priority to U.S. Provisional Patent Application No. 63/261,998, filed on Oct. 1, 2021, entitled "BIT SELECTION FOR MULTI-SLOT UPLINK SHARED CHANNEL TRANSMISSION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for bit selection for multi-slot uplink shared channel transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of one or more sets of time domain resources for a multi-slot transmission occasion that spans multiple slots. The method may include selecting, for one or more codeblocks of a communication on the multi-slot transmission occasion, non-contiguous coded bits of a plurality of coded bits on a per slot basis for each of the multiple slots. The method may include interleaving, for each of the multiple slots, the non-contiguous coded bits to form one or more interleaved encoded bit sequences of the one or more codeblocks. The method may include transmitting the communication including the one or more interleaved encoded bit sequences.

Some aspects described herein relate to a method of wireless communication performed by a UE. The method may include receiving an indication of one or more sets of time domain resources for a multi-slot transmission occasion that spans multiple slots. The method may include interleaving, for each of the multiple slots, encoded bits for a communication on the multi-slot transmission occasion to form an interleaved buffer. The method may include selecting, for one or more codeblocks of the communication, coded bits from the interleaved buffer on a per slot basis for each of the multiple slots. The method may include transmitting the communication across the multiple slots, the communication including the coded bits.

Some aspects described herein relate to a method of wireless communication performed by a network node. The method may include transmitting an indication of one or more sets of time domain resources for a multi-slot transmission occasion that spans multiple slots. The method may include receiving, on the multi-slot transmission occasion, a communication including an interleaved encoded bit sequence of one or more codeblocks. The method may include demapping the interleaved encoded bit sequence to obtain information on a per slot basis for each of the multiple slots. The method may include selectively de-interleaving the information based at least in part on an interleaver configuration or a modulation order depth associated with the communication. The method may include decoding the information.

Some aspects described herein relate to a UE for wireless communication. The user equipment may include a memory and one or more processors coupled to the memory. The one or more processors may be configured to receive an indication of one or more sets of time domain resources for a multi-slot transmission occasion that spans multiple slots. The one or more processors may be configured to select, for one or more codeblocks of a communication on the multi-slot transmission occasion, non-contiguous coded bits of a plurality of coded bits on a per slot basis for each of the multiple slots. The one or more processors may be configured to interleave, for each of the multiple slots, the non-contiguous coded bits to form one or more interleaved encoded bit sequences of the one or more codeblocks. The one or more processors may be configured to transmit the communication including the one or more interleaved encoded bit sequences.

Some aspects described herein relate to a UE for wireless communication. The UE may include a memory and one or more processors coupled to the memory. The one or more processors may be configured to receive an indication of one or more sets of time domain resources for a multi-slot transmission occasion that spans multiple slots. The one or more processors may be configured to interleave, for each of the multiple slots, encoded bits for a communication on the multi-slot transmission occasion to form an interleaved buffer. The one or more processors may be configured to select, for one or more codeblocks of the communication, coded bits from the interleaved buffer on a per slot basis for each of the multiple slots. The one or more processors may be configured to transmit the communication across the multiple slots, the communication including the coded bits.

Some aspects described herein relate to a network node for wireless communication. The network node may include a memory and one or more processors coupled to the memory. The one or more processors may be configured to transmit an indication of one or more sets of time domain resources for a multi-slot transmission occasion that spans multiple slots. The one or more processors may be configured to receive, on the multi-slot transmission occasion, a communication including an interleaved encoded bit sequence of one or more codeblocks. The one or more processors may be configured to demap the interleaved encoded bit sequence to obtain information on a per slot basis for each of the multiple slots. The one or more processors may be configured to selectively de-interleave the information based at least in part on an interleaver configuration or a modulation order depth associated with the communication. The one or more processors may be configured to decode the information.

Some aspects described herein relate to a non-transitory computer-readable medium that stores a set of instructions for wireless communication by a UE. The set of instructions, when executed by one or more processors of the UE, may cause the UE to receive an indication of one or more sets of time domain resources for a multi-slot transmission occasion that spans multiple slots. The set of instructions, when executed by one or more processors of the UE, may cause the UE to select, for one or more codeblocks of a communication on the multi-slot transmission occasion, non-contiguous coded bits of a plurality of coded bits on a per slot basis for each of the multiple slots. The set of instructions, when executed by one or more processors of the UE, may cause the UE to interleave, for each of the multiple slots, the non-contiguous coded bits to form one or more interleaved encoded bit sequences of the one or more codeblocks. The set of instructions, when executed by one or more processors of the UE, may cause the UE to transmit the communication including the one or more interleaved encoded bit sequences.

Some aspects described herein relate to a non-transitory computer-readable medium that stores a set of instructions for wireless communication by a UE. The set of instructions, when executed by one or more processors, may cause the UE to receive an indication of one or more sets of time domain resources for a multi-slot transmission occasion that spans multiple slots. The set of instructions, when executed by one or more processors of the UE, may cause the UE to interleave, for each of the multiple slots, encoded bits for a communication on the multi-slot transmission occasion to form an interleaved buffer. The set of instructions, when executed by one or more processors of the UE, may cause the UE to select, for one or more codeblocks of the communication, coded bits from the interleaved buffer on a per slot basis for each of the multiple slots. The set of instructions, when executed by one or more processors of the UE, may cause the UE to transmit the communication across the multiple slots, the communication including the coded bits.

Some aspects described herein relate to a non-transitory computer-readable medium that stores a set of instructions for wireless communication by a network node. The set of instructions, when executed by one or more processors of the network node, may cause the network node to transmit an indication of one or more sets of time domain resources for a multi-slot transmission occasion that spans multiple slots. The set of instructions, when executed by one or more processors of the network node, may cause the network node to receive, on the multi-slot transmission occasion, a communication including an interleaved encoded bit sequence of one or more codeblocks. The set of instructions, when executed by one or more processors of the network node, may cause the network node to demap the interleaved encoded bit sequence to obtain information on a per slot basis for each of the multiple slots. The set of instructions, when executed by one or more processors of the network node, may cause the network node to selectively de-interleave the information based at least in part on an interleaver configuration or a modulation order depth associated with the communication. The set of instructions, when executed by one or more processors of the network node, may cause the network node to decode the information.

Some aspects described herein relate to an apparatus for wireless communication. The apparatus may include means for receiving an indication of one or more sets of time domain resources for a multi-slot transmission occasion that spans multiple slots. The apparatus may include means for selecting, for one or more codeblocks of a communication on the multi-slot transmission occasion, non-contiguous coded bits of a plurality of coded bits on a per slot basis for each of the multiple slots. The apparatus may include means for interleaving, for each of the multiple slots, the non-contiguous coded bits to form one or more interleaved encoded bit sequences of the one or more codeblocks. The apparatus may include means for transmitting the communication including the one or more interleaved encoded bit sequences.

Some aspects described herein relate to an apparatus for wireless communication. The apparatus may include means for receiving an indication of one or more sets of time domain resources for a multi-slot transmission occasion that spans multiple slots. The apparatus may include means for interleaving, for each of the multiple slots, encoded bits for a communication on the multi-slot transmission occasion to form an interleaved buffer. The apparatus may include means for selecting, for one or more codeblocks of the communication, coded bits from the interleaved buffer on a per slot basis for each of the multiple slots. The apparatus may include means for transmitting the communication across the multiple slots, the communication including the coded bits.

Some aspects described herein relate to an apparatus for wireless communication. The apparatus may include means for transmitting an indication of one or more sets of time domain resources for a multi-slot transmission occasion that spans multiple slots. The apparatus may include means for receiving, on the multi-slot transmission occasion, a communication including an interleaved encoded bit sequence of one or more codeblocks. The apparatus may include means for demapping the interleaved encoded bit sequence to obtain information on a per slot basis for each of the multiple slots. The apparatus may include means for selectively de-interleaving the information based at least in part on an interleaver configuration or a modulation order depth associated with the communication. The apparatus may include means for decoding the information.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of redundancy version cycling based on uplink transmission occasions, in accordance with the present disclosure.

FIGS. 8-13 are diagrams illustrating examples associated with interleaving and bit selection for multi-slot communications, in accordance with the present disclosure.

FIGS. 14-16 are diagrams illustrating example processes associated with bit selection for multi-slot uplink shared channel transmission, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
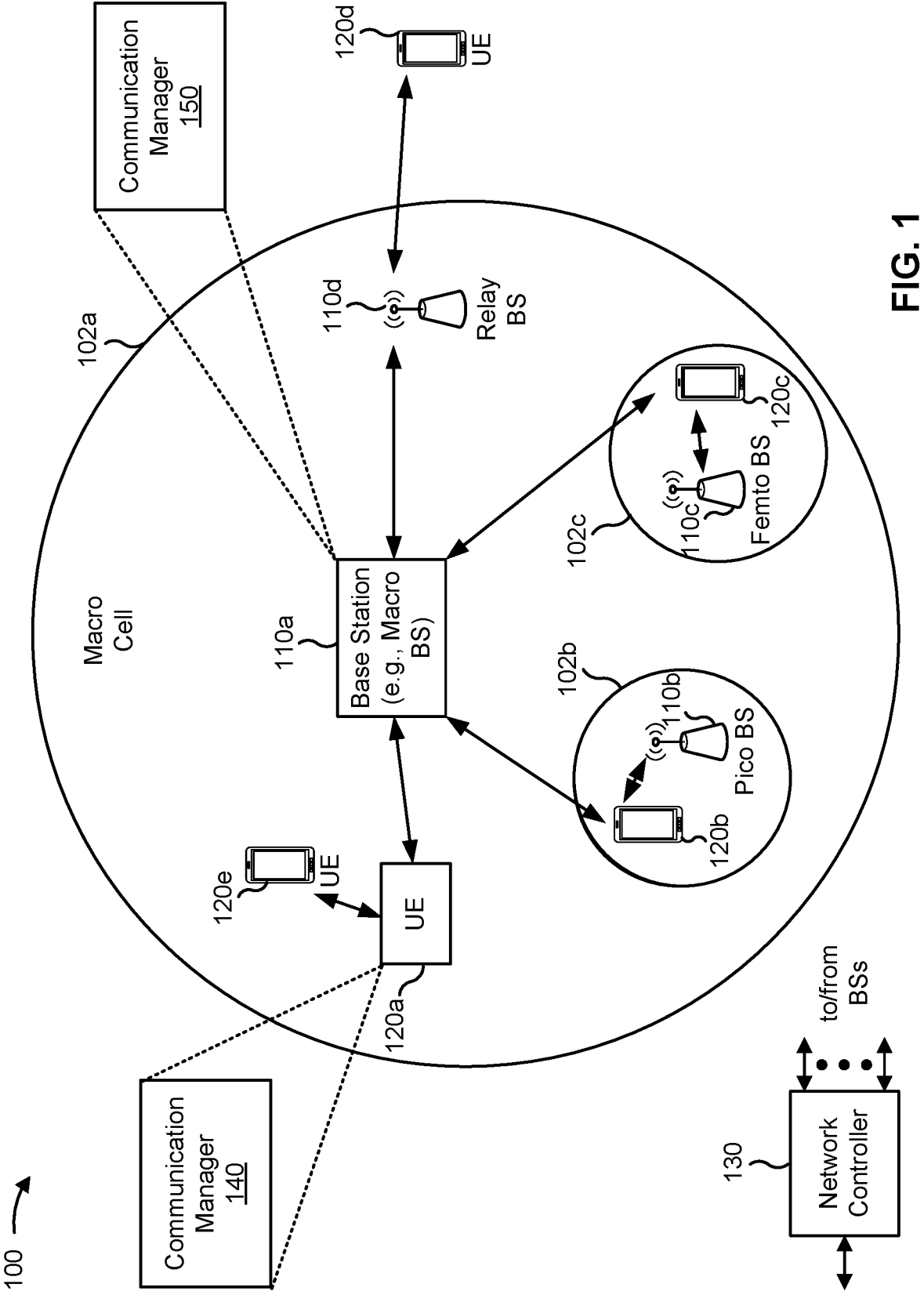
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (e.g., network nodes, shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS or network node) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G New Radio (NR) systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some aspects, the UE 120 may include a communication manager 140. As described in more detail elsewhere herein, the communication manager 140 may receive an indication of one or more sets of time domain resources for a multi-slot transmission occasion that spans multiple slots; select, for one or more codeblocks of a communication on the multi-slot transmission occasion, non-contiguous coded bits of a plurality of coded bits on a per slot basis for each of the multiple slots; interleave, for each of the multiple slots, the non-contiguous coded bits to form one or more interleaved encoded bit sequences of the one or more codeblocks; and transmit the communication including the one or more interleaved encoded bit sequences. Additionally, or alternatively, the communication manager 140 may perform one or more other operations described herein.

In some aspects, the UE 120 may include a communication manager 140. As described in more detail elsewhere herein, the communication manager 140 may receive an indication of one or more sets of time domain resources for a multi-slot transmission occasion that spans multiple slots; interleave, for each of the multiple slots, encoded bits for a communication on the multi-slot transmission occasion to form an interleaved buffer; select, for one or more codeblocks of the communication, coded bits from the interleaved buffer on a per slot basis for each of the multiple slots; and transmit the communication across the multiple slots, the communication including the coded bits. Additionally, or alternatively, the communication manager 140 may perform one or more other operations described herein.

In some aspects, the base station 110 may include a communication manager 150. As described in more detail elsewhere herein, the communication manager 150 may transmit an indication of one or more sets of time domain resources for a multi-slot transmission occasion that spans multiple slots; receive, on the multi-slot transmission occasion, a communication including an interleaved encoded bit sequence of one or more codeblocks; demap the interleaved encoded bit sequence to obtain information on a per slot basis for each of the multiple slots; selectively de-interleave the information based at least in part on an interleaver configuration or a modulation order depth associated with the communication; and decode the information. Additionally, or alternatively, the communication manager 150 may perform one or more other operations described herein.

As indicated above, FIG. 1 is provided as an example. Other examples may differ from what is described with regard to FIG. 1.

Figure 2:
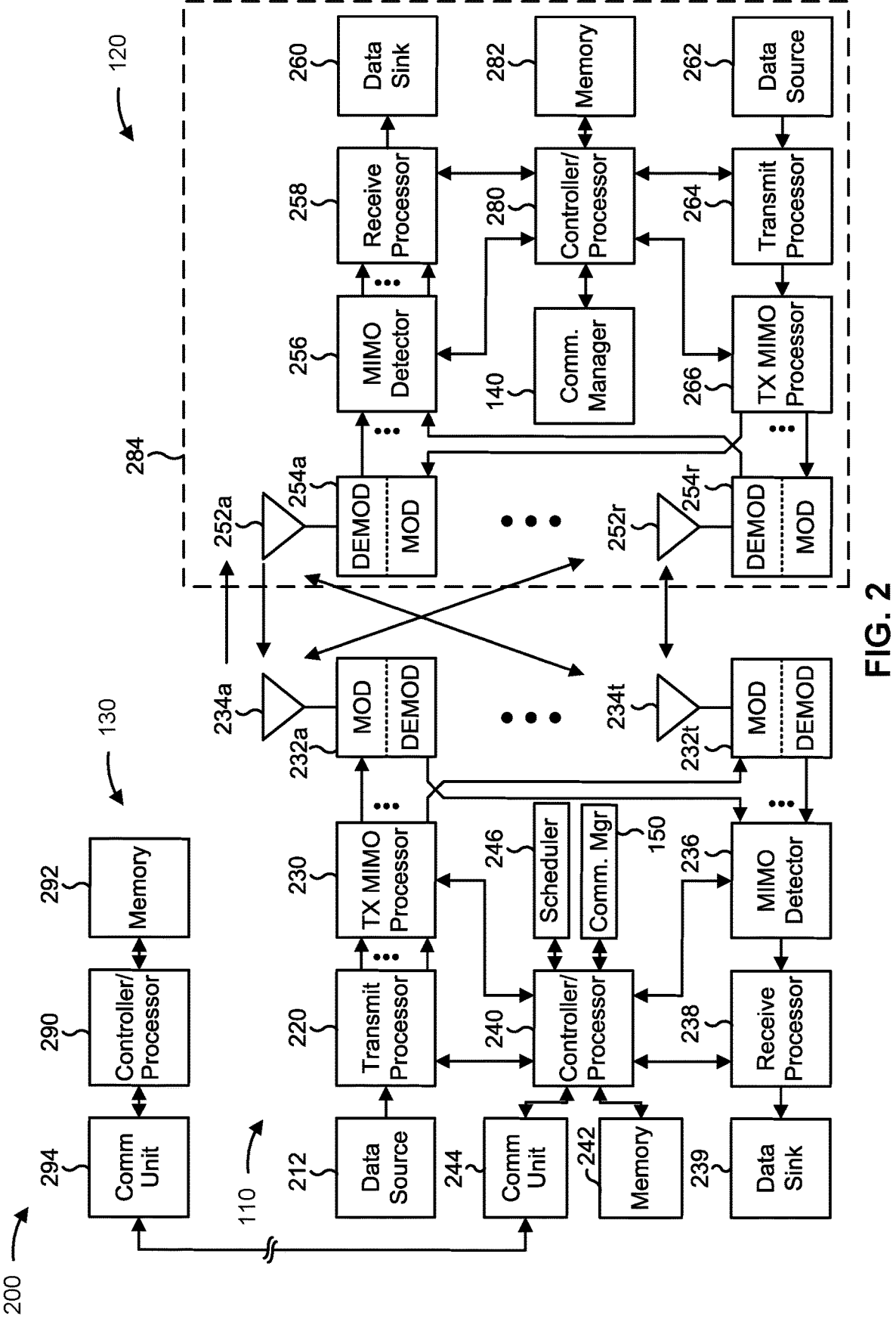
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-18).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-18).

The controller/processor 240 of the base station 110, the controller/processor 280 of the UE 120, and/or any other component(s) of FIG. 2 may perform one or more techniques associated with, as described in more detail elsewhere herein. For example, the controller/processor 240 of the base station 110, the controller/processor 280 of the UE 120, and/or any other component(s) of FIG. 2 may perform or direct operations of, for example, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 15, process 1600 of FIG. 16, and/or other processes as described herein. In some examples, executing instructions may include running the instructions, converting the instructions, compiling the instructions, and/or interpreting the instructions, among other examples.

In some aspects, the UE includes means for receiving an indication of one or more sets of time domain resources for a multi-slot transmission occasion that spans multiple slots; means for selecting, for one or more codeblocks of a communication on the multi-slot transmission occasion, non-contiguous coded bits of a plurality of coded bits on a per slot basis for each of the multiple slots; means for interleaving, for each of the multiple slots, the non-contiguous coded bits to form one or more interleaved encoded bit sequences of the one or more codeblocks; and/or means for transmitting the communication including the one or more interleaved encoded bit sequences. In some aspects, the UE includes means for receiving an indication of one or more sets of time domain resources for a multi-slot transmission occasion that spans multiple slots; means for interleaving, for each of the multiple slots, encoded bits for a communication on the multi-slot transmission occasion to form an interleaved buffer; means for selecting, for one or more codeblocks of the communication, coded bits from the interleaved buffer on a per slot basis for each of the multiple slots; and/or means for transmitting the communication across the multiple slots, the communication including the coded bits. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting an indication of one or more sets of time domain resources for a multi-slot transmission occasion that spans multiple slots; means for receiving, on the multi-slot transmission occasion, a communication including an interleaved encoded bit sequence of one or more codeblocks; means for demapping the interleaved encoded bit sequence to obtain information on a per slot basis for each of the multiple slots; means for selectively de-interleaving the information based at least in part on an interleaver configuration or a modulation order depth associated with the communication; and/or means for decoding the information. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
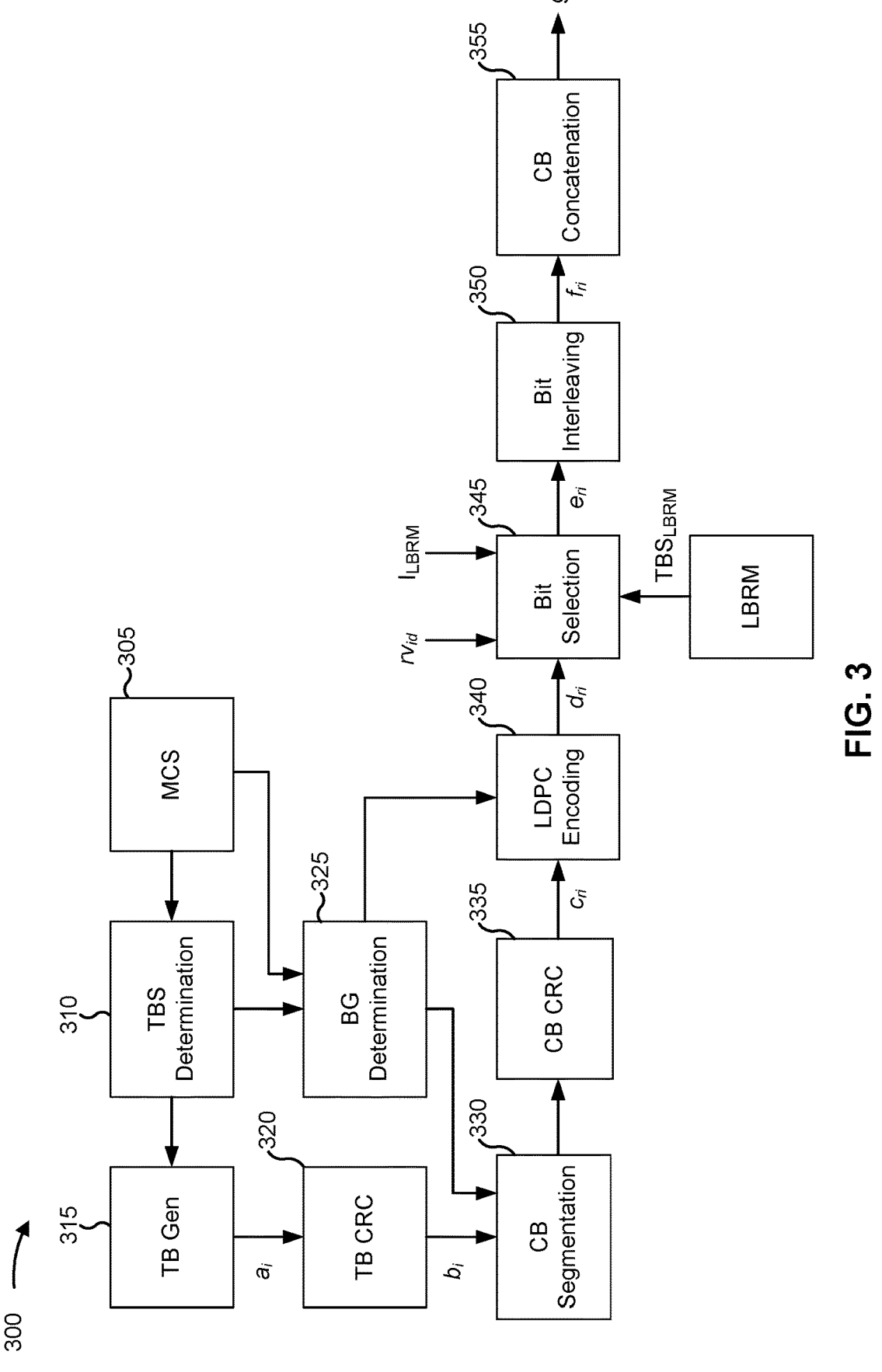
FIG. 3 is a diagram illustrating an example of an uplink transmission coding chain in accordance with the present disclosure.

FIG. 3 is a diagram illustrating an example 300 of an uplink transmission coding chain in accordance with the present disclosure. The coding may be used for the transmission of data payloads in a wireless network, such as via a physical uplink shared channel (PUSCH) or a physical downlink shared channel (PDSCH). The operations of FIG. 3 may be performed by a transmitter, such as a UE (e.g., UE 120) or a base station (e.g., base station 110).

The coding chain may be based at least in part on an MCS, which is shown at 305. An MCS is an index indicating a modulation order and a code rate for a communication. For example, an MCS may indicate how many bits can be transmitted per resource element. A modulation indicates a number of bits (whether parity bits or information bits) per resource element, and a code rate indicates a ratio between information bits and parity bits for encoding. Generally, the MCS is indicated via scheduling information for a given communication, such as in downlink control information (DCI).

At 310, the transmitter may determine a transport block size (TBS) based at least in part on the MCS. A TBS indicates how many bits are to be passed from the medium access control (MAC) layer to the physical layer in one instance of a uplink shared channel transmission that may span more than one slot. For example, the payload for the physical layer (such as in a PUSCH or a PDSCH) is a transport block. The transport block may include a number of bits, determined based at least in part on the MCS and a number of physical resource blocks (PRBs) to be used to transmit the transport block.

At 315, the transmitter may generate a transport block a. For example, the transport block may include a number of bits indicated by the TBS of the transport block. At 320, the UE may append a cyclic redundancy check (CRC) to the transport block to form a transport block $b_i$. The CRC aids in error detection. The CRC may be generated using a cyclic generator polynomial and may be appended to an end of the transport block.

At 325, the transmitter may determine a base graph (BG) for the transport block. A BG is a parameter for determining parity bits for a transmission based at least in part on a TBS and a code rate (with BG1 being intended for transport blocks with a larger TBS, and BG2 being intended for transport blocks with a smaller TBS).

At 330, the transmitter may perform codeblock (CB) segmentation for the transport block $b_i$. "CB segmentation" refers to segmentation of the transport block (TB) to form one or more codeblocks for channel coding and rate matching. Each codeblock may be encoded separately, as described below. For example, the steps shown by reference numbers 335 through 350 may be performed for each separate codeblock of the one or more codeblocks. At 335, the transmitter may append one or more CRCs to the one or more codeblocks to form codeblock(s) $c_{ri}$. For example, the transmitter may perform per-codeblock CRC determination and insertion on the one or more codeblocks $c_{ri}$, which aids in early error detection.

At 340, the transmitter may perform low-density parity check (LDPC) encoding on the one or more codeblocks $c_{ri}$ to form encoded bits $d_{ri}$. More generally, the transmitter may perform channel coding according to one or more parameters such as the BG determined at 320. The LDPC encoding may generate a plurality of encoded bits $d_{ri}$ that are stored in a circular buffer, as described in connection with FIG. 4. In some aspects, the encoded bits may be referred to as an encoded codeblock. The encoded bits $d_{ri}$ are distinct from the codeblocks $c_{ri}$.

At 345, the transmitter may perform bit selection. "Bit selection" refers to selecting coded bits (sometimes referred to as encoded bits) $e_{ri}$ (where the totality of the selected coded bits are represented by E) for interleaving and concatenation. For example, the coded bits $e_{ri}$ may be selected from the encoded bits $d_{ri}$. In some cases, "bit selection," limited buffer rate matching (LBRM), and/or bit interleaving are referred to as "rate matching." As shown, the bit selection may be based at least in part on a redundancy version index ($rv_{id}$), an LBRM index ($I_{LBRM}$), and an LBRM transport block size ($TBS_{LBRM}$).

The transmitter may select a number of coded bits per codeblock. The number of coded bits to be transmitted in a particular transmission (e.g., slot, PUSCH) for a codeblock index r is represented by $E_r$. There can be one or two different values for the number of coded bits per codeblock (e.g., the number of rate matched bits $E_r$ across a plurality of codeblocks could take a value X and/or a value Y per codeblock r, since it may not always be possible to divide available resources equally across all codeblocks). Codeblocks may be aligned to RE boundaries (for example, a single resource element carrying a particular modulation symbol may contain only bits corresponding to a single codeblock). G may represent the actual number of bits available for transmission (e.g., the total number of coded bits available for transmission of the transport block) for a single-slot transmission (that is, for a transmission occasion that occupies only one slot). C' may represent the number of codeblocks to be transmitted, wherein C' is according to a codeblock group transmission information (CBGTI) field if the CBGTI field is present in DCI, or is C (that is, all codeblocks) if the CBGTI field is not present. Bits may be selected (e.g., read) sequentially from the circular buffer. A starting position for a codeblock, $k_0$, may be determined by the redundancy version (RV). In the case of per segment rate matching or per slot rate matching, the starting position may be determined based at least in part on stored information, such as a last position from which the transmitter read a bit for a prior slot or segment. The number of bits read for a transport block is E, and the number of bits read for a given encoded bit sequence $e_{ri}$ is $E_r$, excluding filler bits.

Techniques described herein provide per slot rate matching and per segment rate matching. Further description is provided below. If per slot rate matching is used, G may be defined as the actual number of transmission bits available per slot, and $E_r$ may be defined as the number of coded bits of the rth codeblock to be transmitted in a given slot. If per segment rate matching is used, G may be defined as the actual number of transmission bits available per slot, and $E_r$ may be defined as the number of coded bits of the rth codeblock to be transmitted in a given segment.

At 350, the transmitter may perform interleaving to generate one or more interleaved encoded bit sequences $f_{ri}$. Recall that interleaving is performed on a per-codeblock basis (for each codeblock $c_{ri}$). In some cases, "interleaving" is referred to as "channel interleaving." In some aspects, the transmitter may perform row-column interleaving. In row-column interleaving, selected bits are arranged into a number of rows corresponding to the modulation order. Then, selected bits are read column-by-column, such that bits from each row are interleaved with each other. For redundancy version 0, the interleaver may be a systematic-bit priority interleaver, so that systematic bits are placed in higher reliability positions in a quadrature amplitude modulation (QAM) symbol. When binary phase shift keying (BPSK) is used, the interleaver may not affect the bit stream. At 355, the transmitter may perform codeblock concatenation on the encoded bit sequences $f_{ri}$ to generate a codeblock g (which is distinct from the codeblock(s) $c_{ri}$).

After the codeblock has been generated, the transmitter may transmit the codeblock. For example, the transmitter may perform scrambling, modulation, layer mapping, antenna port mapping, mapping to one or more virtual resource blocks, and mapping from virtual resource blocks to physical resource blocks. Then, the transmitter may transmit a communication carrying an encoded transport block, which is based at least in part on the codeblock.

A receiver may receive the communication carrying the encoded transport block over the time-frequency resources assigned for this transmission occasion. The receiver estimates the channel using the demodulation reference signals transmitted along with the encoded bits. Using the estimated channel and the received signal, the receiver performs the demapping operation on each resource element of the received signal to obtain soft information regarding the bit values of the encoded transport block. Soft information may take the form of a log-likelihood ratio (such as a probability, based on the received signal, that a transmitted bit is a 0 or a 1). This probability could be quantized to a few levels (for example, 16 or 32 levels). In the extreme case that the probability is quantized to 2 levels, the soft information degenerates to "hard" information. For example, a two-level quantization of the probability may represent the receiver's best estimation as to what the transmitted bit was, with no further nuance on this guess.

The receiver may perform de-interleaving on the soft information to obtain de-interleaved soft information. The receiver may concatenate the de-interleaved soft information to obtain concatenated soft information. The receiver may decode the concatenated soft information to infer one or more codeblocks of the communication.

FIG. 4 is a diagram illustrating an example 400 of redundancy version cycling based on uplink transmission occasions, in accordance with the present disclosure. A UE 120 may apply redundancy version cycling to PUSCH repetitions to transmit different redundancy versions of the PUSCH repetition in different transmission occasions.

"Redundancy version" (RV) of a PUSCH repetition refers to a set of encoded bits that are transmitted for that PUSCH repetition. Using RV cycling, the UE 120 transmits a different set of encoded bits in different PUSCH repetitions. For example, the UE 120 may store bits for an uplink transmission in a circular buffer 405 (e.g., stored in memory of the UE 120). The circular buffer 405 stores information bits 410 (also referred to herein as systematic bits) and parity bits 415 (sometimes called parity-check bits). The information bits 410 may include the data to be transmitted, and the parity bits 415 may include linear combinations of the data (e.g., of the information bits 410). The UE 120 may encode information bits 410, parity bits 415, or a combination of information bits 410 and parity bits 415 into a set of encoded bits, and may transmit the set of encoded bits. The particular bits that are selected to be included in the set of encoded bits for a PUSCH repetition depend on (or are defined by) the RV of that PUSCH repetition.

As an example, the starting bit locations may be defined by a table 440, such as for NR hybrid automatic repeat request (HARD) using LDPC code. The table 440 defines starting bit locations in the circular buffer 405 for a first base graph (BG1) and a second base graph (BG2). As described herein, a base graph is a parameter for determining parity bits 415 for a transmission based at least in part on a TBS and a code rate (with BG1 being intended for TBs with a larger TBS, and BG2 being intended for TBs with a smaller TBS). Referring to the table, Ncb represents the length of the circular buffer 405 (e.g., the number of bits included in the circular buffer 405), and Zc represents a lifting size, which is based at least in part on the number of information bits 410 and the number of BG columns corresponding to information bits 410.

In some examples, a base station 110 may transmit information, such as an RV index, to the UE 120. For example, the base station 110 may transmit the RV index for a PUSCH communication (e.g., a PUSCH transmission) in DCI that schedules the PUSCH communication. The RV index may indicate a sequence of RVs to be applied to a corresponding sequence of PUSCH transmission occasions (e.g., PUSCH opportunities). The UE 120 may increment a counter n (sometimes called an index n) for each uplink transmission occasion following (or indicated by) the DCI. The UE 120 may use the information transmitted by the base station 110 (e.g., the RV index) and the value of the counter n for a particular transmission occasion to determine an RV to be applied to that transmission occasion.

For example, as shown by table 445, for PUSCH Repetition Type A, if the base station 110 indicates an RV index of 0, then the UE 120 may determine an RV to be applied to an nth transmission occasion (e.g., for PUSCH Repetition Type A) by calculating n mod 4, where mod represents a modulo operation. If n mod 4=0 (e.g., for transmission occasion 0), then the UE 120 applies RV0 to that transmission occasion. If n mod 4=1 (e.g., for transmission occasion 1), then the UE 120 applies RV2 to that transmission occasion. If n mod 4=2 (e.g., for transmission occasion 2), then the UE 120 applies RV3 to that transmission occasion. If n mod 4=3 (e.g., for transmission occasion 3), then the UE 120 applies RV1 to that transmission occasion. As shown, the RV index may have a value of 0, 1, 2, or 3, each of which corresponds to a different sequence of RVs (e.g., a different order for RV0, RV1, RV2, and RV3).

Similarly, for PUSCH Repetition Type B, if the base station 110 indicates an RV index of 0, then the UE 120 may determine an RV to be applied to an nth actual repetition (e.g., of PUSCH Repetition Type B) by calculating n mod 4, where mod represents a modulo operation. If n mod 4=0 (e.g., for actual repetition 0), then the UE 120 applies RV0 to that actual repetition. If n mod 4=1 (e.g., for actual repetition 1), then the UE 120 applies RV2 to that actual repetition. If n mod 4=2 (e.g., for actual repetition 2), then the UE 120 applies RV3 to that actual repetitions. If n mod 4=3 (e.g., for actual repetition 3), then the UE 120 applies RV1 to that actual repetition.

As indicated above, FIG. 4 is provided as an example. Other examples may differ from what is described with respect to FIG. 4. For example, the RV cycling technique shown in table 445 is one example of an RV cycling technique, and other RV cycling techniques may be used.

Figure 5:
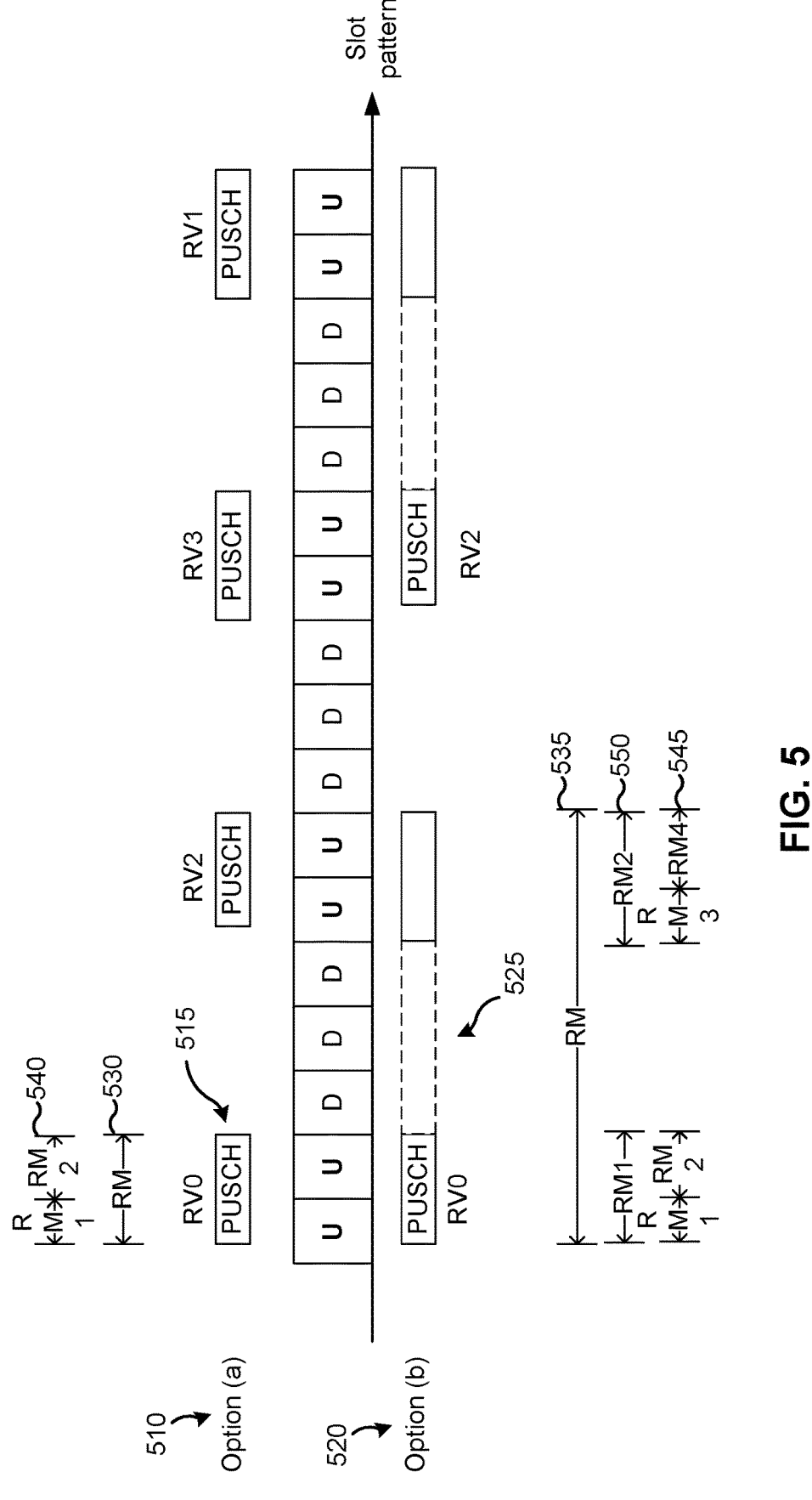
FIG. 5 is a diagram illustrating an example of multi-slot uplink shared channel transmission in accordance with the present disclosure

FIG. 5 is a diagram illustrating an example 500 of multi-slot uplink shared channel transmission in accordance with the present disclosure. Slots are labeled as "U," indicating an uplink slot (that is, a slot with a threshold number of configured or indicated uplink symbols), or "D," indicating a downlink slot (that is, a slot with a threshold number of configured or indicated downlink symbols). Two options are depicted for a UE to transmit PUSCH repetitions over a set of contiguous time domain resources, where the PUSCH repetitions span multiple slots and/or multiple segments, as described in further detail herein. PUSCH repetitions that span multiple slots or multiple segments may be referred to herein as multi-slot PUSCH transmissions. Although techniques are described herein in connection with PUSCH repetitions and multi-slot PUSCH transmissions, these techniques can be applied to various types of uplink repetitions, such as an uplink data repetition, an uplink control repetition (such as physical uplink control channel (PUCCH) repetition), or the like.

A repetition, such as an uplink repetition or a downlink repetition, may be used to improve reliability, such as for ultra reliable low latency communication (URLLC) or for UEs located in a geographic area with poor channel conditions (such as a cell edge). When repetitions are used, a transmitter repeats transmission of a communication multiple times. For example, a UE may transmit an initial uplink communication and may repeat transmission of (that is, may retransmit) that uplink communication one or more times. Each repetition may include different encoded bits in accordance with different RVs, as described herein. Therefore, a receiver can attempt to combine multiple repetitions to improve the likelihood of successfully decoding a payload of the multiple repetitions.

As used herein, the term "repetition" is used to refer to the initial communication and is also used to refer to a repeated transmission of the initial communication. For example, if a UE is configured to transmit four repetitions, then the UE may transmit an initial transmission and may transmit three repeated transmissions of that initial transmission. Thus, each transmission (regardless of whether the transmission is an initial transmission or a retransmission) is counted as a repetition. A repetition may be transmitted in a transmission occasion, which is sometimes referred to as a transmission instance. In these examples, a transmission occasion is a multi-slot transmission occasion, which facilitates the transmission of multi-slot PUSCH transmissions.

For a first type of multi-slot PUSCH transmission, shown at 510 and referred to as Option (a), each repetition and each multi-slot transmission occasion spans a set of contiguous resources (such as symbols or slots). Option (a) may enable, for example, a UE to transmit a transport block, spanning a set of contiguous slots, in a single transmission occasion. For example, for a first multi-slot PUSCH transmission 515 that includes a codeblock associated with RV0, the repetition is shown spanning a set of two contiguous slots. As used herein "spanning across a set of contiguous slots" means "including at least one symbol of each slot of the set of contiguous slots."

For a second type of multi-slot PUSCH transmission, shown at 520 and referred to as Option (b), each repetition spans two or more segments, and a segment includes a set of contiguous slots. Option (b) may enable, for example, a UE to transmit a transport block, spanning multiple sets of contiguous slots, in a single transmission occasion. For example, for a second multi-slot PUSCH transmission 525 that includes a codeblock associated with RV0, the repetition is shown spanning two sets of contiguous slots. Thus, the repetition is transmitted on two segments of the transmission occasion, where a first segment occupies at least part of the first and second slots of the slot pattern, and a second segment occupies at least part of the sixth and seventh slots of the slot pattern.

In some aspects, RV cycling may be performed on a per slot basis. For example, each slot of a multi slot transmission occasion may be assigned a respective RV index. In some aspects, RV cycling may be performed on a per transmission occasion basis. For example, each transmission occasion may be assigned a respective RV index. In some aspects, RV cycling may be performed on a per segment basis. For example, each segment of a transmission occasion may be assigned a respective RV index.

In some aspects, rate matching (shown as "RM") may be performed on a per transmission occasion basis. Per transmission occasion rate matching is shown by reference number 530 for option (a) and reference number 535 for option (b). In other aspects, rate matching may be performed on a per slot basis. For option (a), shown by reference number 540, first rate matching may be performed for a first slot of a transmission occasion and second rate matching may be performed for a second slot of a transmission occasion. For option (b), shown by reference number 545, respective rate matching may be performed for each slot of a transmission occasion (that is, twice for the two slots of the first segment and twice for the two slots of the second segment). In yet other aspects, as shown by reference number 550, rate matching may be performed on a per segment basis.

As indicated above, FIG. 5 is provided as an example. Other examples may differ from what is described with respect to FIG. 5.

Figure 6:
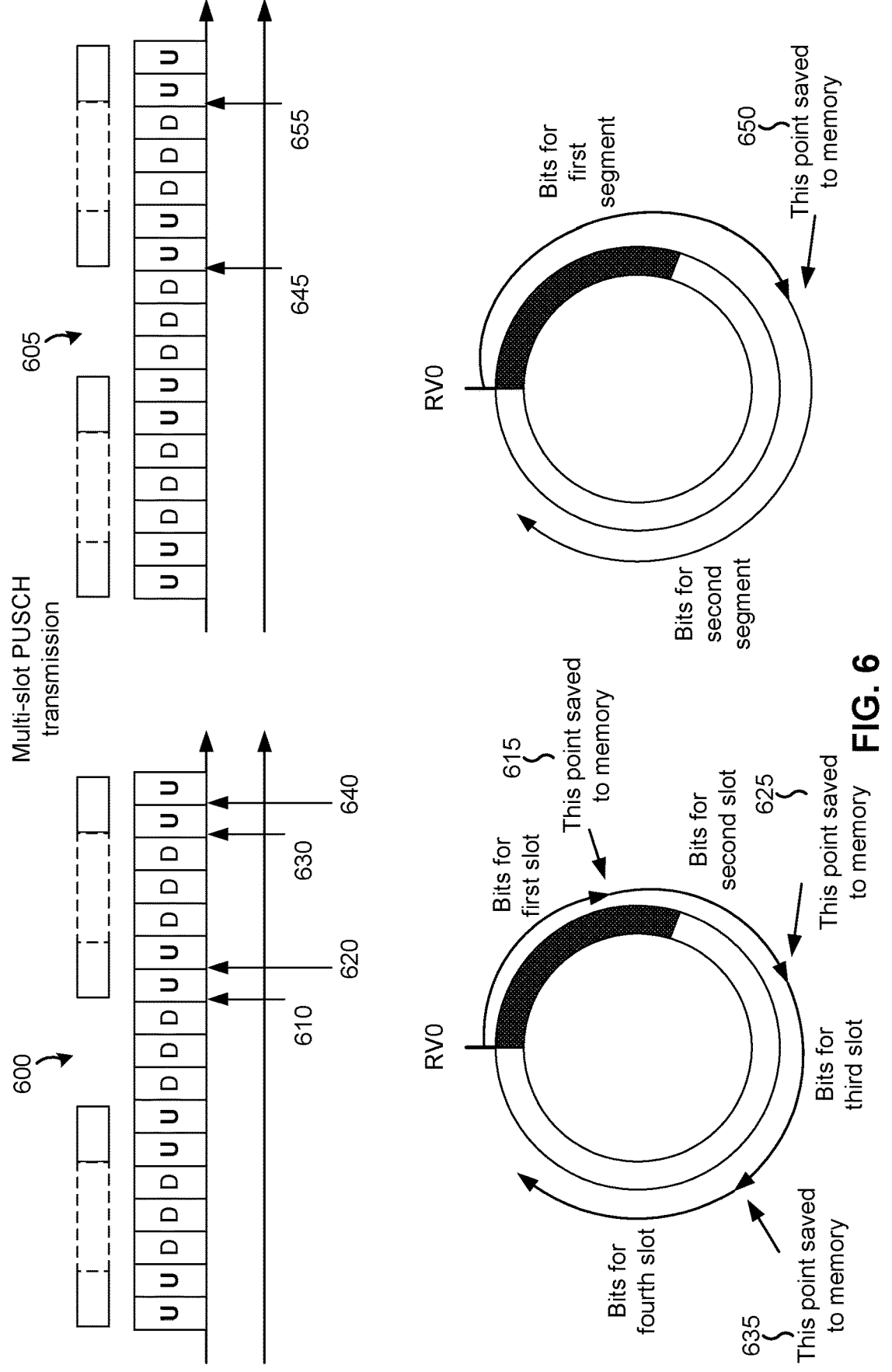
FIG. 6 is a diagram illustrating examples of circular buffer reading and bit selection for per slot and per segment rate matching, in accordance with the present disclosure.

FIG. 6 is a diagram illustrating examples of circular buffer reading and bit selection for per slot and per segment rate matching, in accordance with the present disclosure.

As shown in FIG. 6, example 600 depicts per slot rate matching for option (b). As shown, the UE may determine parameters for rate matching for a first slot of the first segment 610, and the UE may identify and read rate matching bits from the circular buffer (starting at the starting position indicated by the RV index) in accordance with the parameters for rate matching for the first slot of the first segment 610. The UE may save (e.g., to memory) a first point 615 in the circular buffer at which the UE ceases reading the rate matching bits for the first slot of the first segment 610. Then, the UE may determine parameters for rate matching for a second slot of the first segment 620, and the UE may identify and read rate matching bits from the circular buffer in accordance with the parameters for rate matching for the second slot of the first segment 620 starting at the first point 615 in the circular buffer. The UE may save (e.g., to memory) a second point 625 in the circular buffer at which the UE ceases reading the rate matching bits for the second slot of the first segment 620. The UE may determine parameters for rate matching for a first slot of the second segment 630 and may identify and read rate matching bits from the circular buffer (starting at the second point 625) in accordance with the parameters for rate matching for the first slot of the second segment 630. The UE may save (e.g., to memory) a third point 635 in the circular buffer at which the UE ceases reading the rate matching bits for the first slot of the second segment 630. Then, the UE may determine parameters for rate matching for a second slot of the second segment 640 and may identify and read rate matching bits from the circular buffer in accordance with the parameters for rate matching for the second slot of the second segment 640 starting at the third point 635 in the circular buffer. For example, the UE may read only bits consumed in a given slot for rate matching of the given slot.

In some aspects, the UE may perform per slot rate matching with RV cycling. For example, consider a multi-slot PUSCH transmission occasion with four non-contiguous segments of two slots each. The UE may perform per slot rate matching and interleaving (as described above) for each of a plurality of first slots (such as each slot of a first N segments of the four segments) using a first RV index. The UE may then perform per slot rate matching and interleaving for each of a plurality of second slots (such as each slot of a remainder of the four segments) using a second RV index. In some aspects, the plurality of first slots may be based at least in part on a sequence of slots, such as information indicating a number of slots for which the per slot rate matching is to be performed before moving to a next RV index in an RV cycle.

Example 605 depicts per segment rate matching for option (b). As shown, the UE may determine parameters for rate matching for a first segment 645, and the UE may identify and read rate matching bits from the circular buffer (starting at the starting position indicated by the RV index) in accordance with the parameters for rate matching for the first segment 645. The UE may save (e.g., to memory) a point 650 in the circular buffer at which the UE ceases reading the rate matching bits for the first segment 645. Then, the UE may determine parameters for rate matching for a second segment 655, and the UE may identify and read rate matching bits from the circular buffer in accordance with the parameters for rate matching for the second segment 655 starting at the point 650 in the circular buffer that was saved by the UE. For example, the UE may read bits consumed in the first segment 645 from the circular buffer, then may read bits consumed in the second segment 655 from the circular buffer. Thus, per segment rate matching is enabled.

In some aspects, rate matching may be performed across a multi-slot PUSCH transmission occasion (e.g., for both segments and all four slots). In this situation, the UE may perform steps similar to those described for per segment rate matching, but without the stopping and saving at the point 650 in the circular buffer and instead reading the entire circular buffer.

While multi-slot PUSCH transmissions may be rate matched on a per slot, per segment, or per transmission occasion basis, different types of rate matching may be associated with different considerations. For example, rate matching on a per slot basis may enable the use of existing communication frameworks that work on multi-slot and traditional single slot PUSCH transmissions; however, per slot (and per segment) rate matching may distribute information bits unevenly across the multiple slots. When rate matching on a per segment or per transmission occasion basis, a new and/or separate communication framework may be required to ensure proper interleaving at a transmitter and de-interleaving at a receiver. The foregoing considerations may lead to increase complexity at the transmitter and receiver to support interleaving and de-interleaving. In addition, an uneven distribution of information bits may lead to an increased error rate or other problems in transmission (e.g., if a first slot with the most information bits is not successfully communicated).

Some techniques and apparatuses described herein enable bit selection in a manner that may provide various benefits for multi-slot transmissions. For example, a UE may select (e.g., from a circular buffer) non-contiguous coded bits, on a per slot basis, for interleaving in a manner designed to distribute information bits among the multiple slots of the multi-slot transmission. As another example, a UE may interleave encoded bits prior to rate matching, which may distribute information bits among the multiple slots of the multi-slot transmission. As a result, an error rate associated with multi-slot transmissions may be reduced by distributing information bits among the multiple slots and reducing the likelihood of an error in any single slot causing a high failure rate. In addition, current single slot transmission frameworks may be compatible with per slot rate matching techniques, which may reduce complexity for transmission and reception of multi-slot communications. The reduced complexity and error rate may result in improved efficiency (e.g., processing and/or power efficiency) for transmitters and/or receivers and improve throughput and reliability of the network supporting multi-slot communications.

As indicated above, FIG. 6 is provided as an example. Other examples may differ from what is described with respect to FIG. 6.

Figure 7:
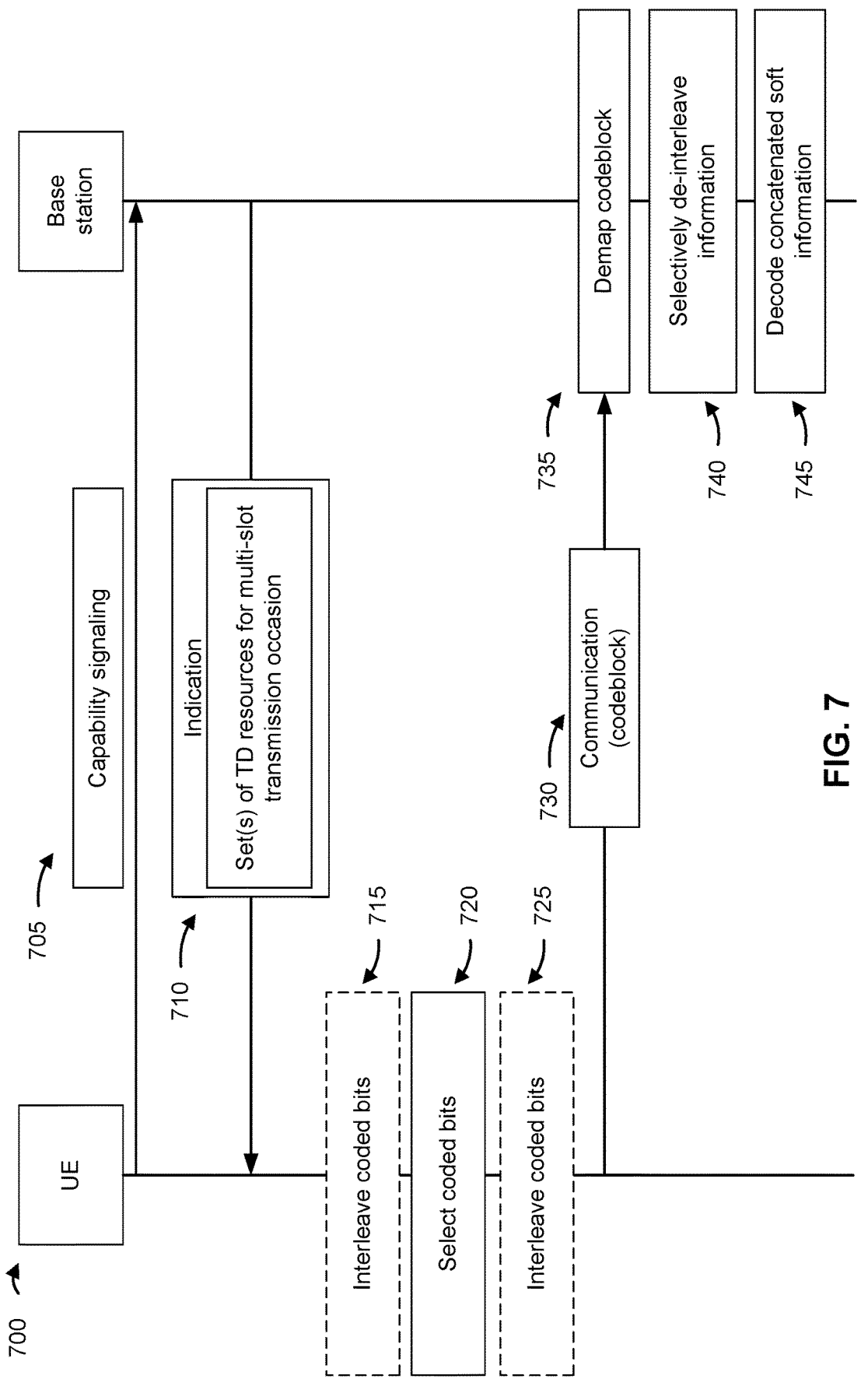
FIG. 7 is a diagram illustrating an example associated with bit selection for multi-slot uplink shared channel transmission, in accordance with the present disclosure.

FIG. 7 is a diagram illustrating an example 700 associated with bit selection for multi-slot uplink shared channel transmission, in accordance with the present disclosure. As shown in FIG. 7, a base station (e.g., base station 110) and a UE (e.g., UE 120) may communicate with one another. The UE and the base station may be part of a wireless network (e.g., wireless network 100).

As shown by reference number 705, the UE may transmit, and the base station may receive, capability signaling. The capability signaling may identify one or more capabilities of the UE. For example, the capability signaling may indicate one or more features supported by the UE.

In some aspects, the capability signaling may indicate whether the UE supports multi-slot transmission of a transport block. For example, the capability signaling may indicate that the UE supports multi-slot transmission of a transport block with contiguous resources only and a single-codeblock transmission. As another example, the capability signaling may indicate that the UE supports multi-slot transmission of a transport block with contiguous or non-contiguous resources and a single-codeblock transmission. As yet another example, the capability signaling may indicate that the UE supports multi-slot transmission of a transport block with contiguous resources only and with multiple-codeblock transmission. As still another example, the capability signaling may indicate that the UE supports multi-slot transmission of a transport block with contiguous or noncontiguous resources and with a multiple-codeblock transmission.

In some aspects, the capability signaling may indicate support for a rate matching configuration. A rate matching configuration may include per slot rate matching, per transmission occasion rate matching, or per segment rate matching. For example, the UE may transmit capability signaling indicating support for one or more of per slot rate matching (e.g., which may be conditioned on resources of the transmission occasion being contiguous, and/or on a single-codeblock transmission) or per segment rate matching (e.g., which may be conditioned on resources of the transmission occasion being contiguous, and/or on a single-codeblock transmission).

In some aspects, the capability signaling may indicate support associated with interleaving. For example, the capability signaling may indicate whether the UE is capable of dynamically turning on or off (e.g., activating or deactivating) an interleaver. For example, the UE may determine whether to activate or deactivate the interleaver based at least in part on a multi-slot transmission of a transport block (e.g., all instances may have the interleaver turned off) or based at least in part on a multi-slot transmission of a transport block that spans non-contiguous resources.

As shown by reference number 710, the base station may transmit, and the UE may receive, an indication of one or more sets of time domain resources for a multi-slot transmission (MST) occasion that spans multiple slots. In some aspects, the time domain resources are contiguous (e.g., spanning multiple slots without intervening slots). In some aspects, the UE may receive the indication from another device (e.g., from another base station or another UE). In some aspects, the indication may indicate that the base station is capable of receiving codeblocks transmitted using one or more types of bit selection and interleaving processes described herein. The indication may be provided via radio resource control (RRC) signaling, MAC signaling, DCI, a combination thereof, or the like. In some aspects, the indication may include configuration information for the MST occasion. For example, in some aspects, the indication may include data indicating an interleaver configuration, which may be used by the UE to determine whether an interleaver operation is to be enabled or disabled. Additionally or alternatively, the indication may include scheduling information for a transmission on the MST occasion.

In some aspects, the one or more sets of time domain resources for the MST occasion may include (such as consist of) a single set of contiguous time domain resources that span multiple slots, the multiple slots being contiguous with one another (e.g., as in option (a) described herein with reference to FIG. 5). In some aspects, the one or more sets of time domain resources for the MST occasion may include multiple sets of time domain resources. In such examples, each set of time domain resources may span two or more contiguous slots, and different sets of time domain resources may not be contiguous with one another. In addition, each set of time domain resources, of the multiple sets of time domain resources, may be associated with a corresponding segment (e.g., as in option (b) described herein with reference to FIG. 5).

As shown by reference number 715, in some aspects, the UE may interleave encoded bits for a communication on the multi-slot transmission occasion to form an interleaved buffer. For example, encoded bits (e.g., encoded as described herein with reference to FIG. 3) may be placed in a buffer (e.g., a circular buffer) during an encoding process, as described herein. Rather than performing bit selection prior to interleaving, the UE may interleave the encoded bits before performing bit selection.

In some aspects, the UE may read a number of bits from the buffer equal to a product of a number of bits available per slot of the multiple slots and a number of slots included in the multiple slots. For example, assuming one codeblock per slot, there are B bits available per slot, and N is the number of slots for the multi-slot transmission, the UE may read B*N bits from the buffer. The number of bits available per slot, B, may be independent of uplink control information (UCI) multiplexing considerations (e.g., situations where some slots may include both UCI and data). In some aspects, the UE may read a number of bits equal to a quotient of a number of bits available per slot divided by a number of codeblocks included in the multi-slot transmission, multiplied by a number of slots included in the multi-slot transmission. For example, assuming C represents the number of codeblocks for a multi-slot transmission, the UE may read (B/C)*N bits from the buffer.

In some aspects, the UE may interleave the encoded bits within a circular buffer (e.g., generating an interleaved circular buffer). For example, the UE may perform an interleaving operation (e.g., row-column interleaving, or another form of interleaving, as described herein) on the encoded bits that are in the circular buffer and then save the interleaved bits back into the circular buffer for bit selection. In some aspects, the UE may interleave the encoded bits from a circular buffer and write the interleaved bits to an interleaved buffer that is separate from the circular buffer. In some aspects, the separate interleaved buffer may be a circular buffer, though other buffers (e.g., a linear buffer) may also be used. In some aspects, the UE may interleave the encoded bits to form multiple interleaved buffers. For example, in a situation where the multi-slot transmission includes multiple codeblocks, the UE may interleave the encoded bits to form an interleaved buffer for each of the multiple codeblocks.

In some aspects, the UE may interleave a subset of the coded bits. By interleaving (e.g., row-column interleaving or otherwise) a subset of the coded bits, the interleaver process need not be performed on all encoded bits, which may not all be used for a transmission.

In some aspects, the UE may select an interleaver depth associated with interleaving the encoded bits. For example, when performing row-column interleaving, the depth may indicate how many rows the encoded bits should be placed before reading the bits in columns. The UE may select the interleaver depth based at least in part on various factors, including, for example, a modulation order associated with the communication, a multiplier of the modulation order, a number of slots included in the multiple slots, or an effective code rate associated with the communication. For example, the modulation order of the communication may refer to a number of bits used for MCS (e.g., 2 for quadrature phase shift keying (QPSK), 4 for 16QAM, and 6 for 64QAM, among other examples). As another example, the depth may be selected by taking the floor (e.g., rounding down to the nearest whole number) of 1 divided by the effective code rate associated with the communication. As another example, the depth may be selected based on a largest multiple of the modulation order such that the depth is less than the floor of 1 divided by the effective code rate. The effective code rate may be defined by the TBS for the multi-slot communication divided by a number of bits capable of being transmitted in the multi-slot communication (e.g., TBS/(B*N)).

In some aspects, the depth may be chosen in a manner designed to place as many systematic bits in higher reliability positions for a QAM symbol, as described herein. In some aspects, the depth may be chosen in a manner designed to spread systematic bits across all slots. In some aspects, the depth chosen by the UE may affect whether a second interleaving process should take place after bit selection. For example, there may be no need to perform interleaving a second time if the interleaved bits are already in high reliability positions and/or spread across the multiple slots.

As shown by reference number 720, the UE may select coded bits for communication on an MST occasion on a per slot basis. In some aspects, the UE may select, for one or more codeblocks of the communication, coded bits from the interleaved buffer on a per slot basis for each of the multiple slots. For example, when the UE interleaves the encoded bits (e.g., as described here and with reference to reference number 715), the UE may select the coded bits from the interleaved buffer (e.g., either the interleaved circular buffer or separate interleaved buffer).

In some aspects, when selecting the coded bits on the per slot basis, the UE may select a first subset of the multiple bits for a first slot of the MST occasion and select a second subset of the multiple bits for a second slot of the MST occasion. In such examples, the first slot and the second slot may be contiguous.

In some aspects, the UE may select, for one or more codeblocks of a communication on the multi-slot transmission occasion, non-contiguous coded bits on a per slot basis for each of the multiple slots. For example, rather than interleaving the coded bits prior to selection (e.g., as described herein and with reference to reference number 715), the UE may select the coded bits in a manner designed to produce a string of non-contiguous coded bits for subsequent selective interleaving and transmission.

In some aspects, the UE may select the non-contiguous coded bits from the buffer (e.g., the circular buffer) in which the coded bits are stored. In some aspects, the start locations for bit selection from the circular buffer may be based at least in part on an RV index of the circular buffer. For example, the UE may select bits using a starting location based on the MST occasion being associated with RV=0, 1, or 2. In some aspects, when selecting the non-contiguous coded bits, the UE may select every pth bit from the buffer, where p is a number of slots included in the MST occasion. By selecting every pth bit from the buffer, and assuming the starting location is RV=0, the first bits selected for each slot are systematic bits, which results in systematic bits being spread across the slots of the MST occasion and also located at the first bits of each slot. For example, selected non-contiguous bits for each slot may include multiple systematic bits followed by multiple parity bits.

In some aspects, after selecting the coded bits, systematic bits of the coded bits occupy locations within a string of the coded bits that are a multiple of the modulation order of the communication. As described herein, having systematic bits located in higher reliability slots may facilitate higher quality communications.

As shown by reference number 725, in some aspects, the UE may selectively interleave coded bits for transmission on the MST occasion. For example, in a situation where the UE already performed interleaving (e.g., as described herein and with reference to reference number 715), the UE may forego interleaving at this point, as the coded bits may already be interleaved. In a situation where the UE did not perform interleaving prior to selecting the coded bits (e.g., as described herein and with reference to reference number 720), the UE may interleave the coded bits. For example, the UE may interleave, for each of the multiple slots, the selected non-contiguous coded bits to form one or more interleaved encoded bit sequences of one or more codeblocks for transmission on the MST occasion.

In some aspects, the UE may selectively forego interleaving a second time, after selecting the coded bits, based at least in part on a depth associated with the first interleaving of the encoded bits. For example, whether the UE performs the second interleaving may depend on whether a depth associated the first interleaving of the encoded bits was selected to distribute systematic bits in desirable locations. For example, in a situation where the depth of the first interleaving process was a multiple of a modulation order of the communication, the UE may forego the second interleaving process.

In some aspects, whether the UE foregoes interleaving may depend upon data indicating an interleaver configuration, which may be a static configuration and/or dynamically configured by the base station, as described herein.

In some aspects, the interleaving may result in each slot, of the multiple slots, including a same proportion of systematic and parity bits. In some aspects, the interleaving may result in each slot, of the multiple slots, including at least one systematic bit. As described herein, an error rate for the communication may be reduced in situations where systematic bits are spread across slots of the MST occasion.

As shown by reference number 730, the UE may transmit, and the base station may receive, the communication. For example, the communication may include an encoded transport block that is generated based at least in part on one or more interleaved encoded bit sequences (such as a plurality of interleaved encoded bit sequences). In some aspects, the communication may be a PUSCH transmission that includes a single transport block, and the MST occasion may be a multi-slot PUSCH transmission occasion.

As shown by reference number 735, the base station may de-map the encoded codeblock to obtain soft information on the transmitted bits. For example, in some aspects, the base station may de-map the encoded codeblock to obtain the soft information, as described in more detail in connection with FIG. 3.

As shown by reference number 740, the base station may selectively de-interleave the soft information to form de-interleaved soft information, on a per slot basis. In some aspects, the selective de-interleaving is based at least in part on an interleaver configuration and/or modulation order depth associated with the communication, as described herein. For example, the manner in which the base station de-interleaves the communication may be based on a manner in which the UE interleaved the communication, as described herein.

In some aspects, when de-interleaving on the per slot basis, the base station may de-interleave a first subset of the soft information for a first slot of the MST occasion and de-interleave a second subset of the soft information for a second slot of the MST occasion. In such examples, the first slot and the second slot may be contiguous of one another. In some aspects, the MST occasion may consist of a single set of contiguous time domain resources that span the first slot and the second slot.

In some aspects, the codeblock may be one of multiple codeblocks of the communication. In such examples, the base station may selectively de-interleave on the per slot basis based at least in part on the codeblock spanning across two slots or two segments.

As shown by reference number 745, the base station may concatenate the soft information and decode the concatenated soft information to infer one or more codeblocks of the communication. For example, the base station may decode the transmitted bits based on the concatenated soft information that is presented as input to the decoder. The decoding block partitions the concatenated soft information to identify the soft information associated with each encoded codeblock. Each such partition is then used to decode the actual transmitted bits corresponded to that codeblock.

As indicated above, FIG. 7 is provided as an example. Other examples may differ from what is described with respect to FIG. 7.

FIGS. 8-13 are diagrams illustrating examples associated with interleaving and bit selection for multi-slot communications, in accordance with the present disclosure.

Figure 8:
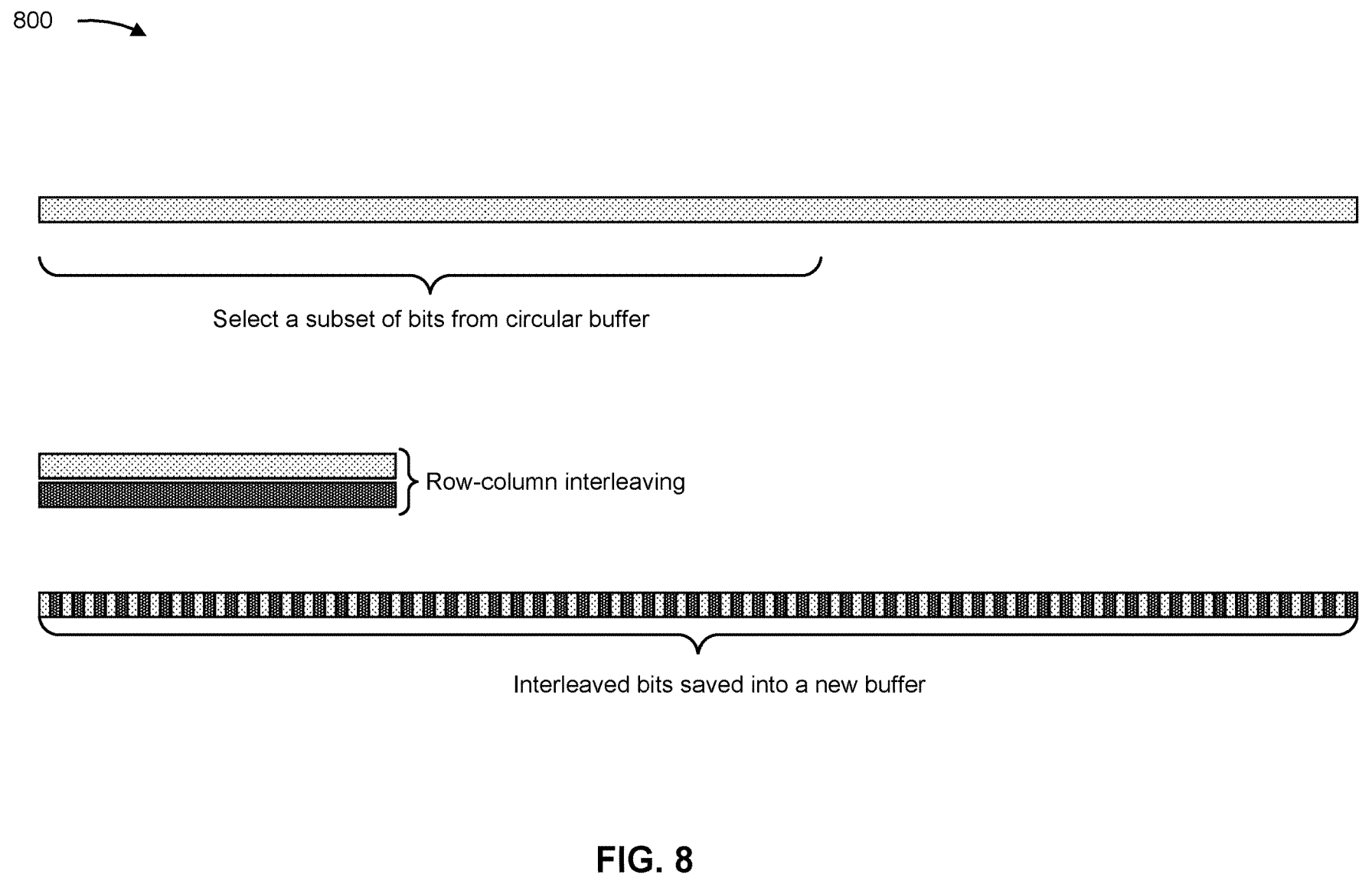

FIG. 8 depicts an example 800 of a row-column interleaving process for interleaving a subset of bits from a circular buffer, as described herein. For example, a subset of bits may first be selected from a circular buffer and placed, in this example 800, in two rows. After being placed in two rows, columns of bits are read, top-to-bottom and left-to-right, to form interleaved bits, which can be saved into a new buffer.

Figure 9:
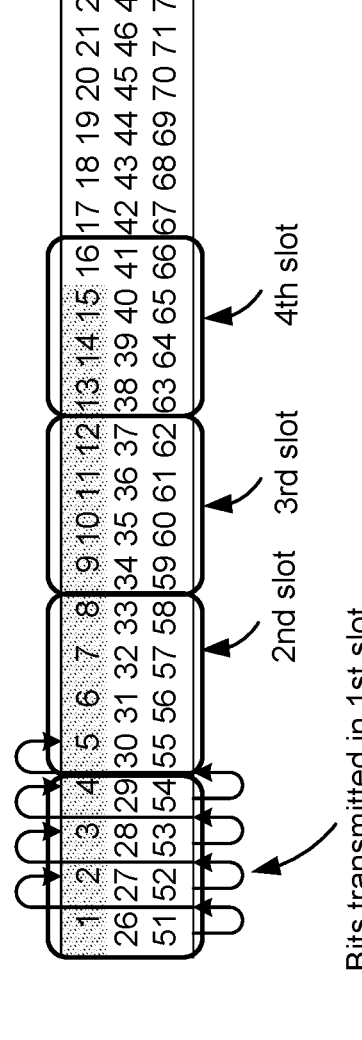

FIG. 9 depicts an example 900 of a row-column inter-leaving process and rate matching, as described herein. In the example 900, a 4-slot MST occasion is shown, where each slot is capable of carrying 12 encoded bits, and a depth of 3 is chosen for interleaving. As also shown, there are 75 bits in the buffer, with 15 systematic bits (depicted in a darker shade) and 60 parity bits. When selecting bits for each slot, the UE may read from top-to-bottom, left-to-right. The example interleaving and rate matching may result in the selected coded bits shown in FIG. 10.

FIG. 10 depicts an example 1000 of selected coded bit sequences. For example, the selected coded bit sequences may be based on an interleaving and rate matching process shown in FIG. 9 and as described herein. In example 1000, each slot is shown as having 3 systematic bits. In this example, each of the systematic bits also occupies a location, within each slot, that is considered higher reliability for certain modulation orders (e.g., QPSK and 16QAM, in this example), which may indicate that these bit sequences do not need further interleaving.

Figure 11:
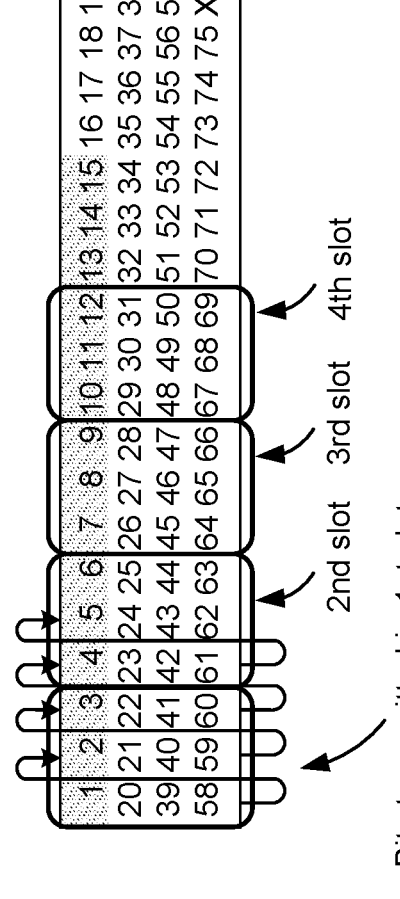

FIG. 11 depicts an example 1100 of a row-column inter-leaving process and rate matching, as described herein. Example 1100 is similar to example 900 of FIG. 9, except that a depth of 4 is chosen for interleaving. The example interleaving and rate matching may result in the selected coded bits shown in FIG. 12.

FIG. 12 depicts an example 1200 of selected coded bit sequences. For example, the selected coded bit sequences may be based on an interleaving and rate matching process shown in FIG. 11 and as described herein. In example 1200, each slot is shown as having 4 systematic bits. In this example, while not every systematic bit is occupying a higher reliability location for certain modulation order, the slots do contain all of the systematic bits.

FIG. 13 depicts an example 1300 of selecting non-contiguous coded bits on a per slot basis, as described herein. In this example, by starting at a value of 1, and selecting every $4^{th}$ bit of a circular buffer until each slot is full, the systematic bits are located at the beginning of each slot. As shown, this would enable UCI multiplexing, as described herein, to add bits for UCI after the systematic bits, which may enable the multi-slot communication to include all systematic bits and UCI. In this example, the non-contiguous coded bits may be interleaved, as described herein, to spread the systematic bits out within each slot and potentially place the systematic bits in locations of higher reliability prior to transmission.

FIGS. 9-13 are provided as examples. Other examples may differ from what is described with respect to FIGS. 9-13.

As described herein, some techniques and apparatuses enable bit selection in a manner that may provide various benefits for multi-slot transmissions. For example, a UE may select (e.g., from a circular buffer) non-contiguous coded bits, on a per slot basis, for interleaving in a manner designed to distribute information bits among the multiple slots of the multi-slot transmission. As another example, a UE may interleave encoded bits prior to rate matching, which may distribute information bits among the multiple slots of the multi-slot transmission. As a result, an error rate associated with multi-slot transmissions may be reduced by distributing information bits among the multiple slots and reducing the likelihood of an error in any single slot causing a high failure rate. In addition, current single slot transmission frameworks may be compatible with per slot rate matching techniques, which may reduce complexity for transmission and reception of multi-slot communications.

The reduced complexity and error rate may result in improved efficiency (e.g., processing and/or power efficiency) for transmitters and/or receivers and improve throughput and reliability of the network supporting multi-slot communications.

FIG. 14 is a diagram illustrating an example process 1400 performed, for example, by a UE, in accordance with the present disclosure. Example process 1400 is an example where the UE (e.g., UE 120) performs operations associated with bit selection for multi-slot uplink shared channel transmission.

As shown in FIG. 14, in some aspects, process 1400 may include receiving an indication of one or more sets of time domain resources for a multi-slot transmission occasion that spans multiple slots (block 1410). For example, the UE (e.g., using communication manager 140 and/or reception component 1702, depicted in FIG. 17) may receive an indication of one or more sets of time domain resources for a multi-slot transmission occasion that spans multiple slots, as described above.

As further shown in FIG. 14, in some aspects, process 1400 may include selecting, for one or more codeblocks of a communication on the multi-slot transmission occasion, non-contiguous coded bits of a plurality of coded bits on a per slot basis for each of the multiple slots (block 1420). For example, the UE (e.g., using communication manager 140 and/or selection component 1708, depicted in FIG. 17) may select, for one or more codeblocks of a communication on the multi-slot transmission occasion, non-contiguous coded bits of a plurality of coded bits on a per slot basis for each of the multiple slots, as described above.

As further shown in FIG. 14, in some aspects, process 1400 may include interleaving, for each of the multiple slots, the non-contiguous coded bits to form one or more inter-leaved encoded bit sequences of the one or more codeblocks (block 1430). For example, the UE (e.g., using communication manager 140 and/or interleaving component 1710, depicted in FIG. 17) may interleave, for each of the multiple slots, the non-contiguous coded bits to form one or more interleaved encoded bit sequences of the one or more codeblocks, as described above.

As further shown in FIG. 14, in some aspects, process 1400 may include transmitting the communication including the one or more interleaved encoded bit sequences (block 1440). For example, the UE (e.g., using communication manager 140 and/or transmission component 1704, depicted in FIG. 17) may transmit the communication including the one or more interleaved encoded bit sequences, as described above.

Process 1400 may include additional aspects, such as any single aspect or any combination of aspects described below and/or in connection with one or more other processes described elsewhere herein.

In a first aspect, the non-contiguous coded bits are selected from a circular buffer that stores the plurality of coded bits.

In a second aspect, alone or in combination with the first aspect, starting locations for bit selection are based at least in part on an RV index of a circular buffer.

In a third aspect, alone or in combination with one or more of the first and second aspects, selecting the non-contiguous coded bits comprises selecting every pth bit of the plurality of coded bits, where p is a number of slots included in the multiple slots.

In a fourth aspect, alone or in combination with one or more of the first through third aspects, each slot, of the multiple slots, includes a same proportion of systematic and parity bits.

In a fifth aspect, alone or in combination with one or more of the first through fourth aspects, each slot, of the multiple slots, includes at least one systematic bit.

In a sixth aspect, alone or in combination with one or more of the first through fifth aspects, the non-contiguous coded bits include, for each slot of the multiple slots, a plurality of systematic bits followed by a plurality of parity bits.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel. Furthermore, while process 1400 is described using a UE as an example, another device or devices, such as a network node (e.g., base station 110) may perform process 1400.

FIG. 15 is a diagram illustrating an example process 1500 performed, for example, by a UE, in accordance with the present disclosure. Example process 1500 is an example where the UE (e.g., UE 120) performs operations associated with bit selection for multi-slot uplink shared channel transmission.

As shown in FIG. 15, in some aspects, process 1500 may include receiving an indication of one or more sets of time domain resources for a multi-slot transmission occasion that spans multiple slots (block 1510). For example, the UE (e.g., using communication manager 140 and/or reception component 1702, depicted in FIG. 17) may receive an indication of one or more sets of time domain resources for a multi-slot transmission occasion that spans multiple slots, as described above.

As further shown in FIG. 15, in some aspects, process 1500 may include interleaving, for each of the multiple slots, encoded bits for a communication on the multi-slot transmission occasion to form an interleaved buffer (block 1520). For example, the UE (e.g., using communication manager 140 and/or interleaving component 1710, depicted in FIG. 17) may interleave, for each of the multiple slots, encoded bits for a communication on the multi-slot transmission occasion to form an interleaved buffer, as described above.

As further shown in FIG. 15, in some aspects, process 1500 may include selecting, for one or more codeblocks of the communication, coded bits from the interleaved buffer on a per slot basis for each of the multiple slots (block 1530). For example, the UE (e.g., using communication manager 140 and/or selection component 1708, depicted in FIG. 17) may select, for one or more codeblocks of the communication, coded bits from the interleaved buffer on a per slot basis for each of the multiple slots, as described above.

As further shown in FIG. 15, in some aspects, process 1500 may include transmitting the communication across the multiple slots, the communication including the coded bits (block 1540). For example, the UE (e.g., using communication manager 140 and/or transmission component 1704, depicted in FIG. 17) may transmit the communication across the multiple slots, the communication including the coded bits, as described above.

Process 1500 may include additional aspects, such as any single aspect or any combination of aspects described below and/or in connection with one or more other processes described elsewhere herein.

In a first aspect, process 1500 includes selecting an interleaver depth associated with interleaving the encoded bits based at least in part on at least one of a modulation order associated with the communication, a multiplier of the modulation order, a number of slots included in the multiple slots, or an effective code rate associated with the communication.

In a second aspect, alone or in combination with the first aspect, process 1500 includes selectively foregoing an additional interleaving process, after selecting the coded bits, based at least in part on whether a depth associated with the interleaving of the encoded bits is a multiple of a modulation order of the communication.

In a third aspect, alone or in combination with one or more of the first and second aspects, process 1500 includes interleaving, for each of the multiple slots and after selecting the coded bits, the coded bits to form one or more interleaved encoded bit sequences of the one or more codeblocks, and wherein transmitting the communication comprises transmitting the communication including the one or more interleaved encoded bit sequences.

In a fourth aspect, alone or in combination with one or more of the first through third aspects, process 1500 includes receiving configuration information indicating whether to interleave the coded bits, and wherein interleaving the coded bits comprises interleaving the coded bits based at least in part on the configuration information.

In a fifth aspect, alone or in combination with one or more of the first through fourth aspects, the interleaved buffer is separate from the circular buffer.

In a sixth aspect, alone or in combination with one or more of the first through fifth aspects, interleaving the encoded bits comprises interleaving a subset of the encoded bits included in a circular buffer.

In a seventh aspect, alone or in combination with one or more of the first through sixth aspects, interleaving the subset of the encoded bits comprises performing row-column interleaving on bits included in the subset of the encoded bits.

In an eighth aspect, alone or in combination with one or more of the first through seventh aspects, process 1500 includes reading a number of bits from a circular buffer for the interleaving, wherein the number of bits is equal to a product of a number of bits available per slot of the multiple slots and a number of slots included in the multiple slots.

In a ninth aspect, alone or in combination with one or more of the first through eighth aspects, process 1500 includes reading a number of bits from a circular buffer for the interleaving, wherein the number of bits is equal to a quotient of a number of bits available per slot divided by a number of codeblocks included in the one or more codeblocks, multiplied by a number of slots included in the multiple slots.

In a tenth aspect, alone or in combination with one or more of the first through ninth aspects, interleaving the encoded bits comprises interleaving the encoded bits to form a plurality of interleaved buffers for each of a plurality of codeblocks included in the one or more codeblocks.

In an eleventh aspect, alone or in combination with one or more of the first through tenth aspects, after selecting the coded bits, systematic bits of the coded bits occupy locations, within a string of the coded bits, that are a multiple of a modulation order of the communication.

In a twelfth aspect, alone or in combination with one or more of the first through eleventh aspects, the communication is transmitted with all systematic bits associated with the communication.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel. Furthermore, while process 1500 is described using a UE as an example, another device or devices, such as a network node (e.g., base station 110) may perform process 1500.

FIG. 16 is a diagram illustrating an example process 1600 performed, for example, by a network node, in accordance with the present disclosure. Example process 1600 is an example where the network node (e.g., base station 110) performs operations associated with bit selection for multi-slot uplink shared channel transmission.

As shown in FIG. 16, in some aspects, process 1600 may include transmitting an indication of one or more sets of time domain resources for a multi-slot transmission occasion that spans multiple slots (block 1610). For example, the network node (e.g., using communication manager 150 and/or transmission component 1804, depicted in FIG. 18) may transmit an indication of one or more sets of time domain resources for a multi-slot transmission occasion that spans multiple slots, as described above.

As further shown in FIG. 16, in some aspects, process 1600 may include receiving, on the multi-slot transmission occasion, a communication including an interleaved encoded bit sequence of one or more codeblocks (block 1620). For example, the network node (e.g., using communication manager 150 and/or reception component 1802, depicted in FIG. 18) may receive, on the multi-slot transmission occasion, a communication including an interleaved encoded bit sequence of one or more codeblocks, as described above.

As further shown in FIG. 16, in some aspects, process 1600 may include demapping the interleaved encoded bit sequence to obtain information on a per slot basis for each of the multiple slots (block 1630). For example, the network node (e.g., using communication manager 150 and/or demapping component 1808, depicted in FIG. 18) may demap the interleaved encoded bit sequence to obtain information on a per slot basis for each of the multiple slots, as described above.

As further shown in FIG. 16, in some aspects, process 1600 may include selectively de-interleaving the information based at least in part on an interleaver configuration or a modulation order depth associated with the communication (block 1640). For example, the network node (e.g., using communication manager 150 and/or de-interleaving component 1810, depicted in FIG. 18) may selectively de-interleave the information based at least in part on an interleaver configuration or a modulation order depth associated with the communication, as described above.

As further shown in FIG. 16, in some aspects, process 1600 may include decoding the information (block 1650). For example, the network node (e.g., using communication manager 150 and/or decoding component 1812, depicted in FIG. 18) may decode the information, as described above.

Process 1600 may include additional aspects, such as any single aspect or any combination of aspects described below and/or in connection with one or more other processes described elsewhere herein.

In a first aspect, selectively de-interleaving the information comprises foregoing de-interleaving based at least in part on determining that the modulation order depth is a multiple of a modulation order of the communication.

In a second aspect, alone or in combination with the first aspect, process 1600 includes transmitting data indicating the interleaver configuration, wherein the data indicating the interleaver configuration indicates that an interleaver operation is to be enabled or disabled.

In a third aspect, alone or in combination with one or more of the first and second aspects, the interleaved encoded bit sequence includes all systematic bits associated with the communication.

In a fourth aspect, alone or in combination with one or more of the first through third aspects, all systematic bits, included in the interleaved encoded bit sequence, occupy locations, within a string of the interleaved encoded bit sequence, that are a multiple of a modulation order of the communication.

In a fifth aspect, alone or in combination with one or more of the first through fourth aspects, systematic bits, included in the interleaved encoded bit sequence, are distributed across all slots of the multiple slots.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel. Furthermore, while process 1600 is described using a network node as an example, another device or devices, such as a UE (e.g., UE 120) may perform process 1600.

Figure 17:
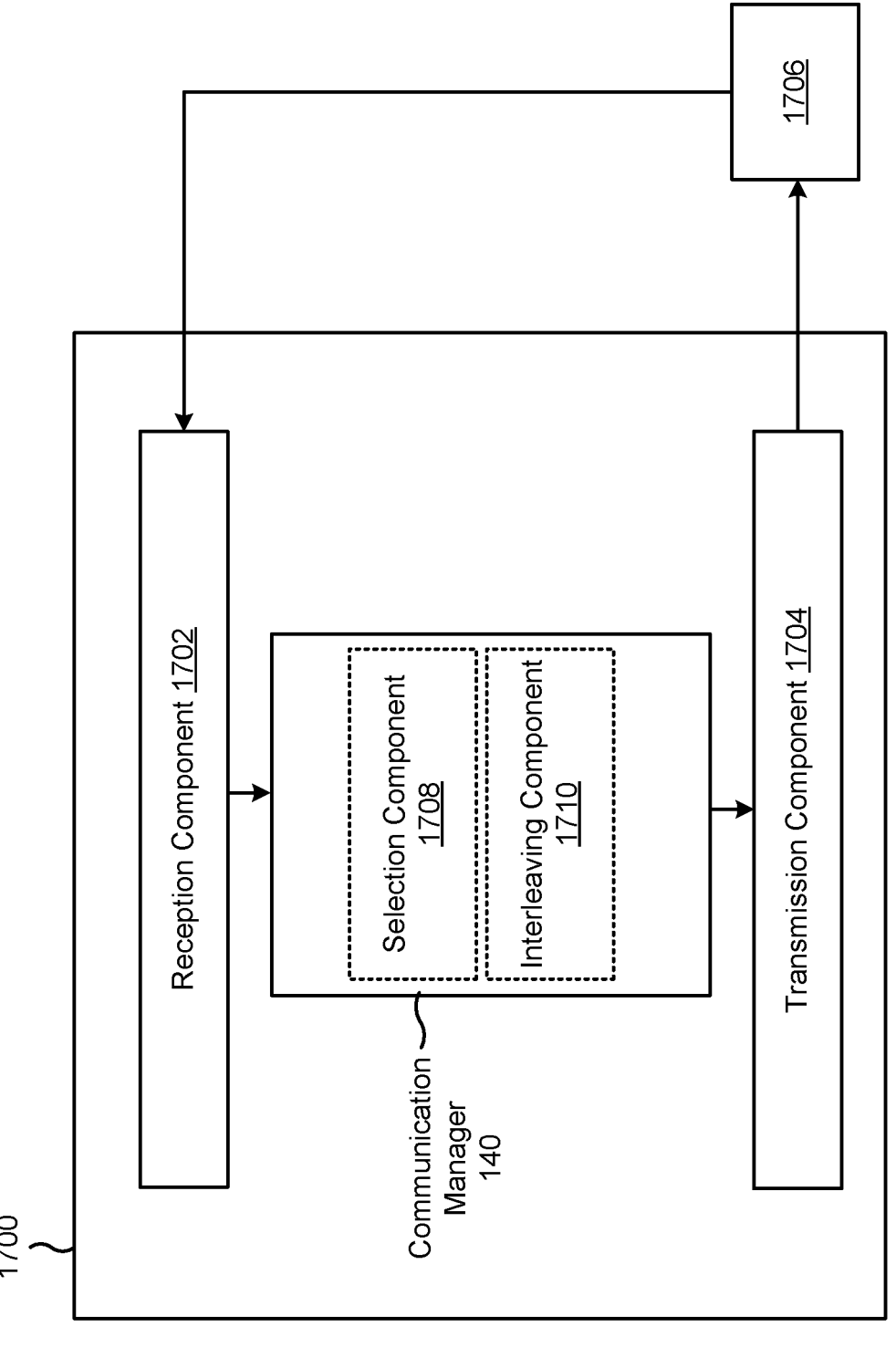
FIGS. 17 and 18 are diagrams of example apparatuses for wireless communication, in accordance with the present disclosure.

FIG. 17 is a diagram of an example apparatus 1700 for wireless communication. The apparatus 1700 may be a UE, or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a network node, or another wireless communication device) using the reception component 1702 and the transmission component 1704. As further shown, the apparatus 1700 may include the communication manager 140. The communication manager 140 may include one or more of a selection component 1708, or an interleaving component 1710, among other examples.

In some aspects, the apparatus 1700 may be configured to perform one or more operations described herein in connection with FIGS. 7-13. Additionally, or alternatively, the apparatus 1700 may be configured to perform one or more processes described herein, such as process 1400 of FIG. 14, process 1500 of FIG. 15, or a combination thereof. In some aspects, the apparatus 1700 and/or one or more components shown in FIG. 17 may include one or more components of the UE described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the UE described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the UE described in connection with FIG. 2. In some aspects, the transmission component 1704 may be co-located with the reception component 1702 in a transceiver.

The reception component 1702 may receive an indication of one or more sets of time domain resources for a multi-slot transmission occasion that spans multiple slots. The selection component 1708 may select, for one or more codeblocks of a communication on the multi-slot transmission occasion, non-contiguous coded bits of a plurality of coded bits on a per slot basis for each of the multiple slots. The interleaving component 1710 may interleave, for each of the multiple slots, the non-contiguous coded bits to form one or more interleaved encoded bit sequences of the one or more codeblocks. The transmission component 1704 may transmit the communication including the one or more interleaved encoded bit sequences.

The reception component 1702 may receive an indication of one or more sets of time domain resources for a multi-slot transmission occasion that spans multiple slots. The interleaving component 1710 may interleave, for each of the multiple slots, encoded bits for a communication on the multi-slot transmission occasion to form an interleaved buffer. The selection component 1708 may select, for one or more codeblocks of the communication, coded bits from the interleaved buffer on a per slot basis for each of the multiple slots. The transmission component 1704 may transmit the communication across the multiple slots, the communication including the coded bits.

The selection component 1708 may select an interleaver depth associated with interleaving the encoded bits based at least in part on at least one of a modulation order associated with the communication, a multiplier of the modulation order, a number of slots included in the multiple slots, or an effective code rate associated with the communication.

The selection component 1708 may selectively forego an additional interleaving process, after selecting the coded bits, based at least in part on whether a depth associated with the interleaving of the encoded bits is a multiple of a modulation order of the communication.

The interleaving component 1710 may interleave, for each of the multiple slots and after selecting the coded bits, the coded bits to form one or more interleaved encoded bit sequences of the one or more codeblocks.

The reception component 1702 may receive configuration information indicating whether to interleave the coded bits.

The selection component 1708 may read a number of bits from a circular buffer for the interleaving, wherein the number of bits is equal to a product of a number of bits available per slot of the multiple slots and a number of slots included in the multiple slots.

The selection component 1708 may read a number of bits from a circular buffer for the interleaving, wherein the number of bits is equal to a quotient of a number of bits available per slot divided by a number of codeblocks included in the one or more codeblocks, multiplied by a number of slots included in the multiple slots.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
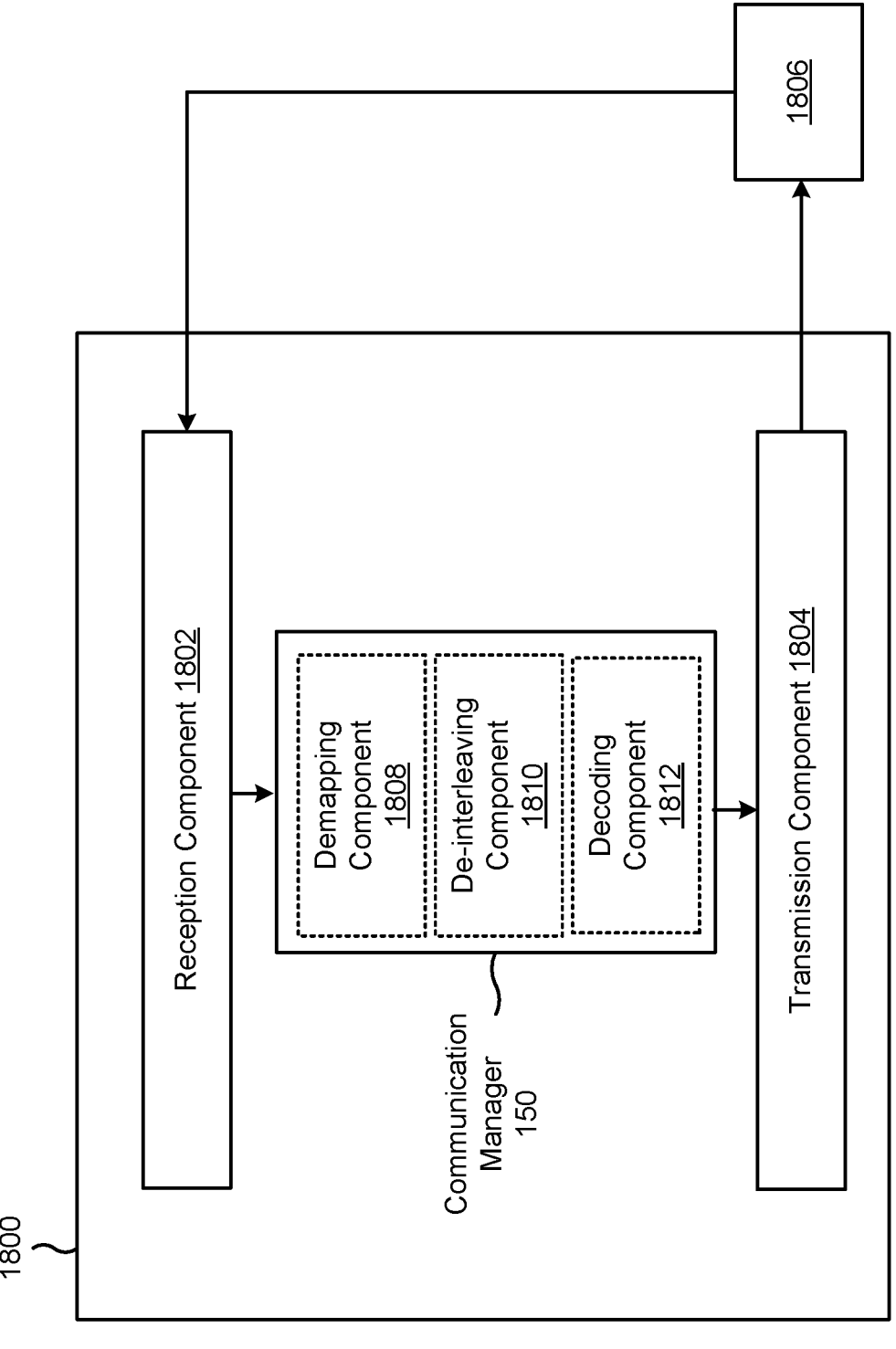

FIG. 18 is a diagram of an example apparatus 1800 for wireless communication. The apparatus 1800 may be a network node (e.g., a base station), or a network node may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a network node, or another wireless communication device) using the reception component 1802 and the transmission component 1804. As further shown, the apparatus 1800 may include the communication manager 150. The communication manager 150 may include one or more of a demapping component 1808, a de-interleaving component 1810, or a decoding component 1812, among other examples.

In some aspects, the apparatus 1800 may be configured to perform one or more operations described herein in connection with FIGS. 7-13. Additionally, or alternatively, the apparatus 1800 may be configured to perform one or more processes described herein, such as process 1600 of FIG. 16. In some aspects, the apparatus 1800 and/or one or more components shown in FIG. 18 may include one or more components of the base station described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the base station described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the base station described in connection with FIG. 2. In some aspects, the transmission component 1804 may be co-located with the reception component 1802 in a transceiver.

The transmission component 1804 may transmit an indication of one or more sets of time domain resources for a multi-slot transmission occasion that spans multiple slots. The reception component 1802 may receive, on the multi-slot transmission occasion, a communication including an interleaved encoded bit sequence of one or more codeblocks. The demapping component 1808 may demap the interleaved encoded bit sequence to obtain information on a per slot basis for each of the multiple slots. The de-interleaving component 1810 may selectively de-interleave the information based at least in part on an interleaver configuration or a modulation order depth associated with the communication. The decoding component 1812 may decode the information.

The transmission component 1804 may transmit data indicating the interleaver configuration wherein the data indicating the interleaver configuration indicates that an interleaver operation is to be enabled or disabled.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a user equipment (UE), comprising: receiving an indication of one or more sets of time domain resources for a multi-slot transmission occasion that spans multiple slots; selecting, for one or more codeblocks of a communication on the multi-slot transmission occasion, non-contiguous coded bits of a plurality of coded bits on a per slot basis for each of the multiple slots; interleaving, for each of the multiple slots, the non-contiguous coded bits to form one or more interleaved encoded bit sequences of the one or more codeblocks; and transmitting the communication including the one or more interleaved encoded bit sequences.

Aspect 2: The method of Aspect 1, wherein the non-contiguous coded bits are selected from a circular buffer that stores the plurality of coded bits.

Aspect 3: The method of any of Aspects 1-2, wherein start locations for bit selection are based at least in part on a redundancy version (RV) index of a circular buffer.

Aspect 4: The method of any of Aspects 1-3, wherein selecting the non-contiguous coded bits comprises: selecting every pth bit of the plurality of coded bits, where p is a number of slots included in the multiple slots.

Aspect 5: The method of any of Aspects 1-4, wherein each slot, of the multiple slots, includes a same proportion of systematic and parity bits.

Aspect 6: The method of any of Aspects 1-5, wherein each slot, of the multiple slots, includes at least one systematic bit.

Aspect 7: The method of any of Aspects 1-6, wherein the non-contiguous coded bits include, for each slot of the multiple slots, a plurality of systematic bits followed by a plurality of parity bits.

Aspect 8: A method of wireless communication performed by a user equipment (UE), comprising: receiving an indication of one or more sets of time domain resources for a multi-slot transmission occasion that spans multiple slots; interleaving, for each of the multiple slots, encoded bits for a communication on the multi-slot transmission occasion to form an interleaved buffer; selecting, for one or more codeblocks of the communication, coded bits from the interleaved buffer on a per slot basis for each of the multiple slots; and transmitting the communication across the multiple slots, the communication including the coded bits.

Aspect 9: The method of Aspect 8, further comprising: selecting an interleaver depth associated with interleaving the encoded bits based at least in part on at least one of: a modulation order associated with the communication, a multiplier of the modulation order, a number of slots included in the multiple slots, or an effective code rate associated with the communication.

Aspect 10: The method of any of Aspects 8-9, further comprising: selectively foregoing an additional interleaving process, after selecting the coded bits, based at least in part on whether a depth associated with the interleaving of the encoded bits is a multiple of a modulation order of the communication.

Aspect 11: The method of any of Aspects 8-10, further comprising: interleaving, for each of the multiple slots and after selecting the coded bits, the coded bits to form one or more interleaved encoded bit sequences of the one or more codeblocks; and wherein transmitting the communication comprises: transmitting the communication including the one or more interleaved encoded bit sequences, wherein transmitting the communication comprises: transmitting the communication including the one or more interleaved encoded bit sequences.

Aspect 12: The method of Aspect 11, further comprising: receiving configuration information indicating whether to interleave the coded bits; and wherein interleaving the coded bits comprises: interleaving the coded bits based at least in part on the configuration information, wherein interleaving the coded bits comprises: interleaving the coded bits based at least in part on the configuration information.

Aspect 13: The method of any of Aspects 8-12, wherein the interleaved buffer is separate from the circular buffer.

Aspect 14: The method of any of Aspects 8-13, wherein interleaving the encoded bits comprises interleaving a subset of the encoded bits included in a circular buffer.

Aspect 15: The method of Aspect 14, wherein interleaving the subset of the encoded bits comprises: performing row-column interleaving on bits included in the subset of the encoded bits.

Aspect 16: The method of any of Aspects 8-15, further comprising: reading a number of bits from a circular buffer for the interleaving, wherein the number of bits is equal to a product of a number of bits available per slot of the multiple slots and a number of slots included in the multiple slots.

Aspect 17: The method of any of Aspects 8-16, further comprising: reading a number of bits from a circular buffer for the interleaving, wherein the number of bits is equal to a quotient of a number of bits available per slot divided by a number of codeblocks included in the one or more codeblocks, multiplied by a number of slots included in the multiple slots.

Aspect 18: The method of any of Aspects 8-17, wherein interleaving the encoded bits comprises: interleaving the encoded bits to form a plurality of interleaved buffers for each of a plurality of codeblocks included in the one or more codeblocks.

Aspect 19: The method of any of Aspects 8-18, wherein after selecting the coded bits, systematic bits of the coded bits occupy locations, within a string of the coded bits, that are a multiple of a modulation order of the communication.

Aspect 20: The method of any of Aspects 8-19, wherein the communication is transmitted with all systematic bits associated with the communication.

Aspect 21: A method of wireless communication performed by a network node, comprising: transmitting an indication of one or more sets of time domain resources for a multi-slot transmission occasion that spans multiple slots; receiving, on the multi-slot transmission occasion, a communication including an interleaved encoded bit sequence of one or more codeblocks; demapping the interleaved encoded bit sequence to obtain information on a per slot basis for each of the multiple slots; selectively de-interleaving the information based at least in part on an interleaver configuration or a modulation order depth associated with the communication; and decoding the information.

Aspect 22: The method of Aspect 21, wherein selectively de-interleaving the information comprises: foregoing de-interleaving based at least in part on determining that the modulation order depth is a multiple of a modulation order of the communication.

Aspect 23: The method of any of Aspects 21-22, further comprising: transmitting data indicating the interleaver configuration, wherein the data indicating the interleaver configuration indicates that an interleaver operation is to be enabled or disabled.

Aspect 24: The method of any of Aspects 21-23, wherein the interleaved encoded bit sequence includes all systematic bits associated with the communication.

Aspect 25: The method of any of Aspects 21-24, wherein all systematic bits, included in the interleaved encoded bit sequence, occupy locations, within a string of the interleaved encoded bit sequence, that are a multiple of a modulation order of the communication.

Aspect 26: The method of any of Aspects 21-25, wherein systematic bits, included in the interleaved encoded bit sequence, are distributed across all slots of the multiple slots.

Aspect 27: An apparatus for wireless communication at a device, comprising a processor; memory coupled with the processor; and instructions stored in the memory and executable by the processor to cause the apparatus to perform the method of one or more of Aspects 1-7.

Aspect 28: An apparatus for wireless communication at a device, comprising a processor; memory coupled with the processor; and instructions stored in the memory and executable by the processor to cause the apparatus to perform the method of one or more of Aspects 8-20.

Aspect 29: An apparatus for wireless communication at a device, comprising a processor; memory coupled with the processor; and instructions stored in the memory and executable by the processor to cause the apparatus to perform the method of one or more of Aspects 21-26.

Aspect 30: A device for wireless communication, comprising a memory and one or more processors coupled to the memory, the one or more processors configured to perform the method of one or more of Aspects 1-7.

Aspect 31: A device for wireless communication, comprising a memory and one or more processors coupled to the memory, the one or more processors configured to perform the method of one or more of Aspects 8-20.

Aspect 32: A device for wireless communication, comprising a memory and one or more processors coupled to the memory, the one or more processors configured to perform the method of one or more of Aspects 21-26.

Aspect 33: An apparatus for wireless communication, comprising at least one means for performing the method of one or more of Aspects 1-7.

Aspect 34: An apparatus for wireless communication, comprising at least one means for performing the method of one or more of Aspects 8-20.

Aspect 35: An apparatus for wireless communication, comprising at least one means for performing the method of one or more of Aspects 21-26.

Aspect 36: A non-transitory computer-readable medium storing code for wireless communication, the code comprising instructions executable by a processor to perform the method of one or more of Aspects 1-7.

Aspect 37: A non-transitory computer-readable medium storing code for wireless communication, the code comprising instructions executable by a processor to perform the method of one or more of Aspects 8-20.

Aspect 38: A non-transitory computer-readable medium storing code for wireless communication, the code comprising instructions executable by a processor to perform the method of one or more of Aspects 21-26.

Aspect 39: A non-transitory computer-readable medium storing a set of instructions for wireless communication, the set of instructions comprising one or more instructions that, when executed by one or more processors of a device, cause the device to perform the method of one or more of Aspects 1-7.

Aspect 40: A non-transitory computer-readable medium storing a set of instructions for wireless communication, the set of instructions comprising one or more instructions that, when executed by one or more processors of a device, cause the device to perform the method of one or more of Aspects 8-20.

Aspect 41: A non-transitory computer-readable medium storing a set of instructions for wireless communication, the set of instructions comprising one or more instructions that, when executed by one or more processors of a device, cause the device to perform the method of one or more of Aspects 21-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving an indication of one or more sets of time domain resources for a multi-slot transmission occasion that spans multiple slots;
   selecting, from a circular buffer that stores a plurality of coded bits and for one or more codeblocks of a communication on the multi-slot transmission occasion, non-contiguous coded bits of the plurality of coded bits on a per slot basis for each of the multiple slots;
   interleaving, for each of the multiple slots, the non-contiguous coded bits to form one or more interleaved encoded bit sequences of the one or more codeblocks; and
   transmitting the communication including the one or more interleaved encoded bit sequences.

2. The method of claim 1, wherein the non-contiguous coded bits include, for each slot of the multiple slots, a plurality of systematic bits followed by a plurality of parity bits.

3. The method of claim 1, wherein start locations for bit selection are based at least in part on a redundancy version (RV) index of a circular buffer.

4. The method of claim 1, wherein selecting the non-contiguous coded bits comprises:
   selecting every pth bit of the plurality of coded bits, where p is a number of slots included in the multiple slots.

5. The method of claim 1, wherein each slot, of the multiple slots, includes a same proportion of systematic and parity bits.

6. The method of claim 1, wherein each slot, of the multiple slots, includes at least one systematic bit.

7. A method of wireless communication performed by a user equipment (UE), comprising:
   receiving an indication of one or more sets of time domain resources for a multi-slot transmission occasion that spans multiple slots;

interleaving, for each of the multiple slots, encoded bits for a communication on the multi-slot transmission occasion;

writing the encoded bits to an interleaved buffer;

selecting, after interleaving the encoded bits and for one or more codeblocks of the communication, coded bits from the interleaved buffer on a per slot basis for each of the multiple slots; and transmitting the communication across the multiple slots, the communication including the coded bits.

8. The method of claim 7, wherein the communication is transmitted with all systematic bits associated with the communication.

9. The method of claim 7, further comprising:

selecting an interleaver depth associated with interleaving the encoded bits based at least in part on at least one of:

a modulation order associated with the communication, a multiplier of the modulation order, a number of slots included in the multiple slots, or an effective code rate associated with the communication.

10. The method of claim 7, further comprising:

selectively foregoing an additional interleaving process, after selecting the coded bits, based at least in part on whether a depth associated with the interleaving of the encoded bits is a multiple of a modulation order of the communication.

11. The method of claim 7, further comprising:

interleaving, for each of the multiple slots and after selecting the coded bits, the coded bits to form one or more interleaved encoded bit sequences of the one or more codeblocks; and wherein transmitting the communication comprises:

transmitting the communication including the one or more interleaved encoded bit sequences.

12. The method of claim 11, further comprising:

receiving configuration information indicating whether to interleave the coded bits; and wherein interleaving the coded bits comprises:

interleaving the coded bits based at least in part on the configuration information.

13. The method of claim 7, wherein the interleaved buffer is separate from a circular buffer.

14. The method of claim 7, wherein interleaving the encoded bits comprises interleaving a subset of the encoded bits included in a circular buffer.

15. The method of claim 14, wherein interleaving the subset of the encoded bits comprises:

performing row-column interleaving on bits included in the subset of the encoded bits.

16. The method of claim 7, further comprising:

reading a number of bits from a circular buffer for the interleaving, wherein the number of bits is equal to a product of a number of bits available per slot of the multiple slots and a number of slots included in the multiple slots.

17. The method of claim 7, further comprising:

reading a number of bits from a circular buffer for the interleaving, wherein the number of bits is equal to a quotient of a number of bits available per slot divided by a number of codeblocks included in the one or more codeblocks, multiplied by a number of slots included in the multiple slots.

18. The method of claim 7, wherein interleaving the encoded bits comprises:

interleaving the encoded bits to form a plurality of interleaved buffers for each of a plurality of codeblocks included in the one or more codeblocks.

19. The method of claim 7, wherein after selecting the coded bits, systematic bits of the coded bits occupy locations, within a string of the coded bits, that are a multiple of a modulation order of the communication.

20. A method of wireless communication performed by a network node, comprising:

transmitting an indication of one or more sets of time domain resources for a multi-slot transmission occasion that spans multiple slots;

receiving, on the multi-slot transmission occasion, a communication including an interleaved encoded bit sequence of one or more codeblocks;

demapping the interleaved encoded bit sequence to obtain information on a per slot basis for each of the multiple slots;

selectively de-interleaving the information based at least in part on an interleaver configuration or a modulation order depth associated with the communication; and decoding the information.

21. The method of claim 20, wherein systematic bits, included in the interleaved encoded bit sequence, are distributed across all slots of the multiple slots.

22. The method of claim 20, wherein selectively de-interleaving the information comprises:

foregoing de-interleaving based at least in part on determining that the modulation order depth is a multiple of a modulation order of the communication.

23. The method of claim 20, further comprising:

transmitting data indicating the interleaver configuration, wherein the data indicating the interleaver configuration indicates that an interleaver operation is to be enabled or disabled.

24. The method of claim 20, wherein the interleaved encoded bit sequence includes all systematic bits associated with the communication.

25. The method of claim 20, wherein all systematic bits, included in the interleaved encoded bit sequence, occupy locations, within a string of the interleaved encoded bit sequence, that are a multiple of a modulation order of the communication.

26. A user equipment (UE) for wireless communication, comprising:

one or more memories; and one or more processors, coupled to the one or more memories, configured to:

receive an indication of one or more sets of time domain resources for a multi-slot transmission occasion that spans multiple slots;

select, from a circular buffer that stores a plurality of coded bits and for one or more codeblocks of a communication on the multi-slot transmission occasion, non-contiguous coded bits of the plurality of coded bits on a per slot basis for each of the multiple slots;

interleave, for each of the multiple slots, the non-contiguous coded bits to form one or more interleaved encoded bit sequences of the one or more codeblocks; and transmit the communication including the one or more interleaved encoded bit sequences.

27. The UE of claim 26, wherein each slot, of the multiple slots, includes a same proportion of systematic and parity bits.

28. The UE of claim 26, wherein each slot, of the multiple slots, includes at least one systematic bit.

29. The UE of claim 26, wherein start locations for bit selection are based at least in part on a redundancy version (RV) index of a circular buffer.

30. The UE of claim 26, wherein the one or more processors, to select the non-contiguous coded bits, are configured to:

select every pth bit of the plurality of coded bits, where p is a number of slots included in the multiple slots.

\* \* \* \* \*